US009106383B2

(12) United States Patent
Kim et al.

(10) Patent No.: US 9,106,383 B2
(45) Date of Patent: Aug. 11, 2015

(54) METHOD AND DEVICE FOR TRANSMITTING A SIGNAL IN A MOBILE COMMUNICATION SYSTEM

(75) Inventors: Hakseong Kim, Anyang-si (KR); Hanbyul Seo, Anyang-si (KR); Daewon Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 128 days.

(21) Appl. No.: 14/110,888

(22) PCT Filed: Apr. 9, 2012

(86) PCT No.: PCT/KR2012/002677
§ 371 (c)(1),
(2), (4) Date: Oct. 9, 2013

(87) PCT Pub. No.: WO2012/141463
PCT Pub. Date: Oct. 18, 2012

(65) Prior Publication Data
US 2014/0029561 A1    Jan. 30, 2014

Related U.S. Application Data

(60) Provisional application No. 61/474,261, filed on Apr. 11, 2011.

(51) Int. Cl.
*H04L 5/00* (2006.01)
*H04W 72/04* (2009.01)
*H04W 8/26* (2009.01)
*H04W 72/12* (2009.01)

(52) U.S. Cl.
CPC .......... *H04L 5/0053* (2013.01); *H04L 5/0041* (2013.01); *H04L 5/0094* (2013.01); *H04W 72/042* (2013.01); *H04W 8/26* (2013.01); *H04W 72/1289* (2013.01)

(58) Field of Classification Search
CPC ....... H04L 5/00; H04L 5/0053; H04L 5/0041; H04W 72/042
See application file for complete search history.

(56) References Cited

U.S. PATENT DOCUMENTS

| 2005/0143123 | A1* | 6/2005 | Black et al. ............... 455/552.1 |
| 2008/0107095 | A1* | 5/2008 | Black et al. ............... 370/342 |
| 2011/0274074 | A1 | 11/2011 | Lee et al. |
| 2011/0287794 | A1* | 11/2011 | Koskela et al. ............... 455/509 |
| 2012/0015607 | A1* | 1/2012 | Koskela et al. ............... 455/62 |
| 2012/0113942 | A1 | 5/2012 | Kim |
| 2013/0294356 | A1* | 11/2013 | Bala et al. ............... 370/329 |
| 2014/0036818 | A1* | 2/2014 | Koskela et al. ............... 370/329 |
| 2014/0161034 | A1* | 6/2014 | Han et al. ............... 370/328 |

FOREIGN PATENT DOCUMENTS

| CA | 2725771 A1 | 12/2009 |
| JP | 2011-511528 A | 4/2011 |
| KR | 10-2010-0039203 A | 4/2010 |
| KR | 10-2010-0084054 A | 7/2010 |
| KR | 10-2011-0004785 A | 1/2011 |

* cited by examiner

*Primary Examiner* — Albert T Chou
(74) *Attorney, Agent, or Firm* — Birch, Stewart, Kolasch & Birch, LLP

(57) ABSTRACT

An embodiment of the present invention relates to a method of a base station to transmit a signal in a wireless communication system. The method includes: transmitting Physical Downlink Control Channel (PDCCH), which includes scheduling information on a resource area of an unlicensed band over a licensed band; and transmitting a sequence, which includes the identifier of a terminal having the resource area allocated, over the unlicensed band. The timing at which the sequence is transmitted may be set prior to a resource area scheduled by the PDCCH.

13 Claims, 23 Drawing Sheets

FIG. 9
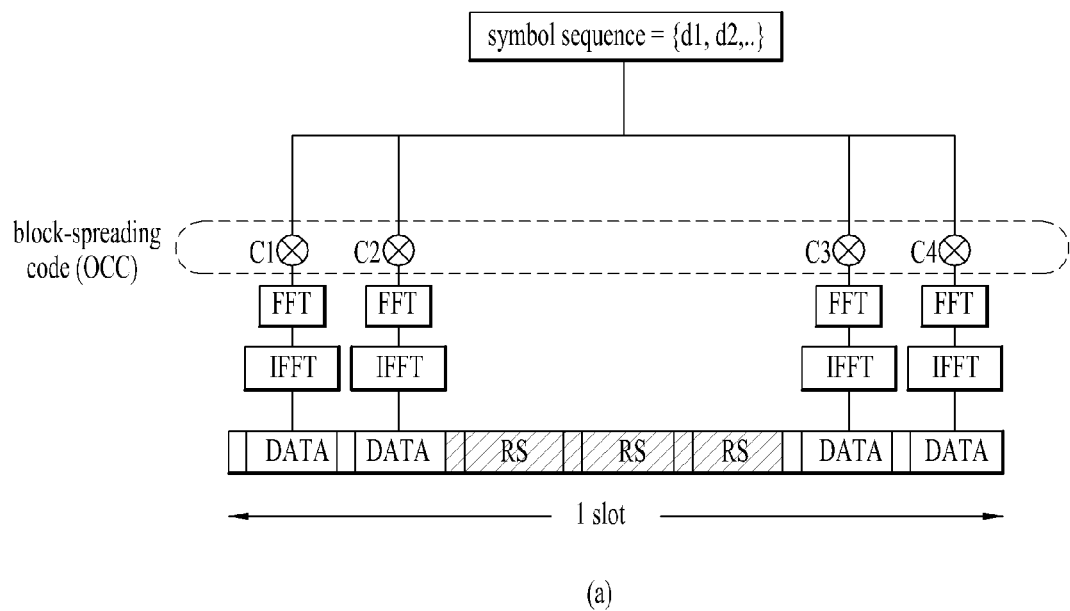
(a)
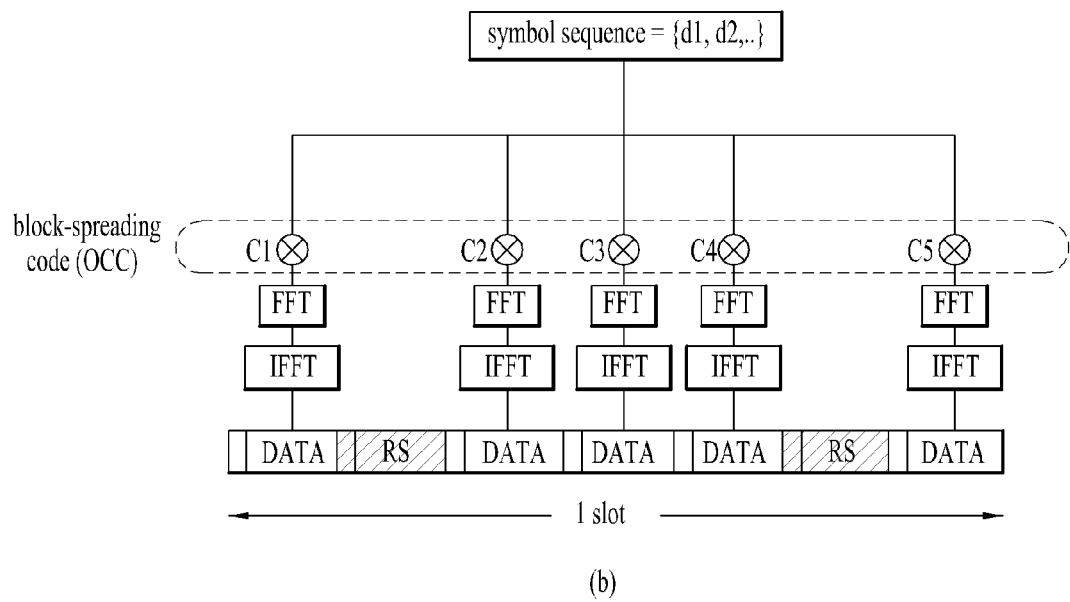
(b)

FIG. 10
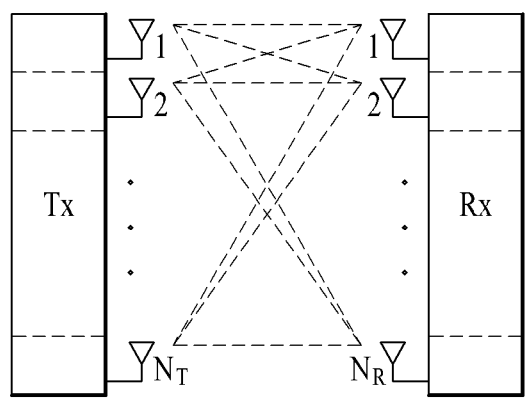
(a)
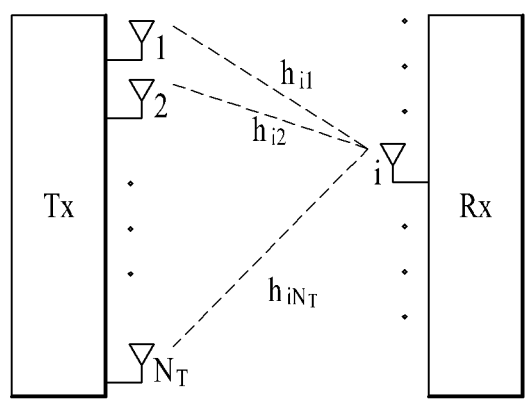
(b)

FIG. 11
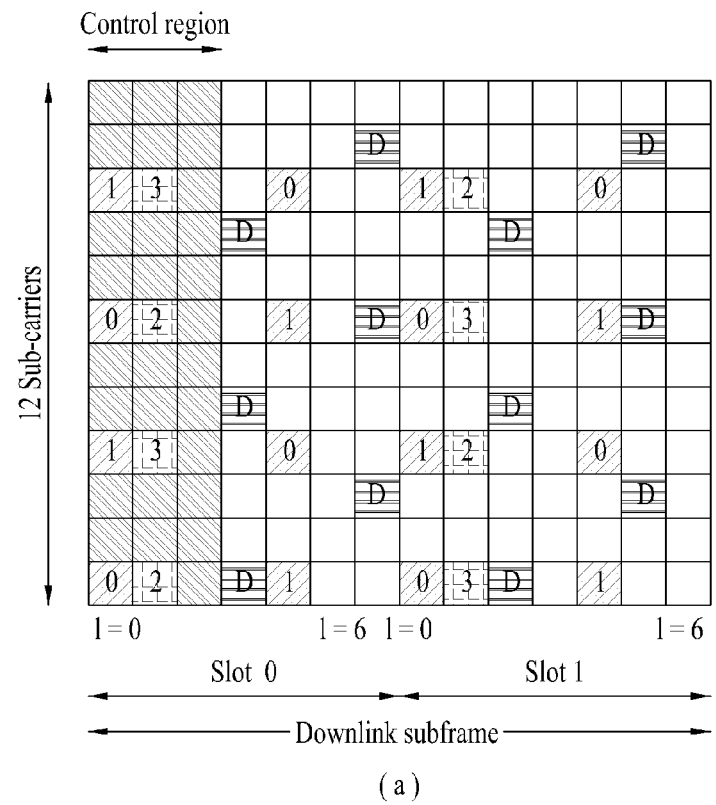
(a)
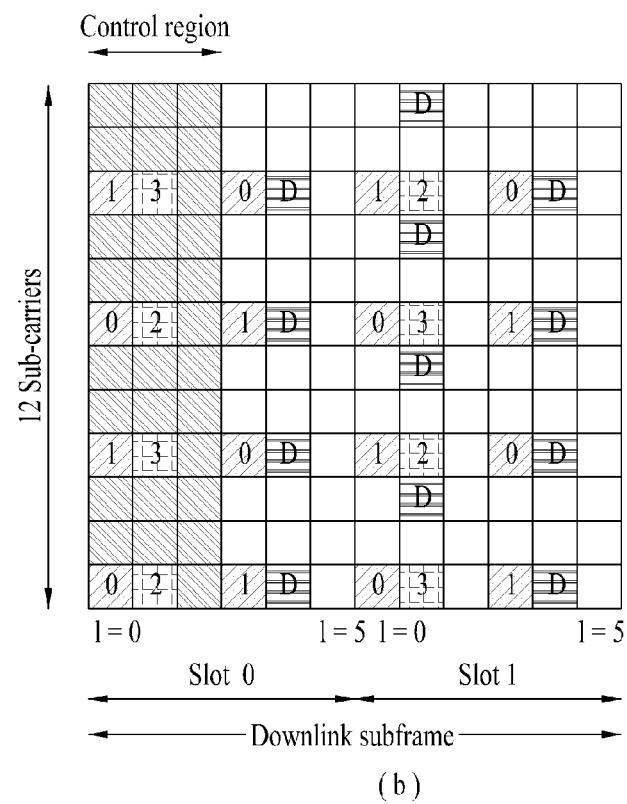
(b)

METHOD AND DEVICE FOR TRANSMITTING A SIGNAL IN A MOBILE COMMUNICATION SYSTEM

CROSS REFERENCE TO RELATED APPLICATIONS

This non-provisional application is a National Stage entry under U.S.C. §371 of International Application No. PCT/KR2012/002677 filed on Apr. 9, 2012, which claims the benefit of U.S. Provisional Application No. 61/474,261 filed on Apr. 11, 2011. The entire contents of all of the above applications are hereby incorporated by reference.

FIELD OF THE INVENTION

The present invention relates to a method and device for transmitting a signal in a mobile communication system.

BACKGROUND ART

Wireless communication systems are being broadly developed in order to provide various types of communication services, such as voice or data services. Generally, a wireless communication system corresponds to a multiple access system that may support communication with multiple users by sharing an available system source (bandwidth, transmission power, and so on). Examples of a multiple access system include a CDMA (code division multiple access) system, an FDMA (frequency division multiple access) system, a TDMA (time division multiple access) system, an OFDMA (orthogonal frequency division multiple access) system, an SC-FDMA (single carrier frequency division multiple access) system, an MC-FDMA (multi-carrier frequency division multiple access), and so on.

DETAILED DESCRIPTION OF THE INVENTION

Technical Objects

The present invention relates to a method and device for transmitting signals and, more particularly, for transmitting information over a frequency band, such as an unlicensed band.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

According to a first technical aspect of the present invention, in a method for transmitting a signal of a base station in a wireless communication system, the method includes the steps of transmitting a PDCCH (Physical Downlink Control Channel) over a licensed band, the PDCCH including scheduling information respective to a resource area of an unlicensed band; and transmitting a sequence over the unlicensed band, the sequence including an identifier of a user equipment to which the resource area is allocated, and wherein the timing at which the sequence is transmitted is set prior to a resource area being scheduled by the PDCCH.

According to a second technical aspect of the present invention, in a method for receiving a signal of a user equipment in a wireless communication system, the method includes the steps of receiving a PDCCH (Physical Downlink Control Channel) from the base station over a licensed band, the PDCCH including scheduling information respective to a resource area of an unlicensed band; and receiving a sequence including an identifier of a user equipment to which the resource area is allocated, the sequence being transmitted from the base station over the unlicensed band, and wherein the timing at which the sequence is transmitted is set prior to a resource area being scheduled by the PDCCH.

According to a third aspect of the present invention, in a base station device in a wireless communication system, the base station device includes a transmitting module; and a processor, wherein the processor transmits a PDCCH (Physical Downlink Control Channel) over a licensed band, the PDCCH including scheduling information respective to a resource area of an unlicensed band, and transmits a sequence over the unlicensed band, the sequence including an identifier of a user equipment to which the resource area is allocated, and wherein the timing at which the sequence is transmitted is set prior to a resource area being scheduled by the PDCCH.

According to a fourth aspect of the present invention, in a user equipment device in a wireless communication system, the user equipment device includes a receiving module; and a processor, wherein the processor receives a PDCCH (Physical Downlink Control Channel) from the base station over a licensed band, the PDCCH including scheduling information respective to a resource area of an unlicensed band, and receives a sequence including an identifier of a user equipment to which the resource area is allocated, the sequence being transmitted from the base station over the unlicensed band, and wherein the timing at which the sequence is transmitted is set prior to a resource area being scheduled by the PDCCH.

The first to fourth technical aspect of the present invention may include all or some of the following details.

The unlicensed band may be configured of an uplink resource area and a downlink resource area being alternately repeated over the time domain.

The sequence may further include an indicator indicating to which one of an uplink resource area and a downlink resource area the resource area corresponds.

The sequence may be selected from a group of sequences being grouped based upon to which one of the uplink resource area and the downlink resource area the resource area corresponds.

The availability of the resource area may be decided by carrier sensing respective to the unlicensed band.

The sequence may be scrambled by the identifier of the user equipment.

The sequence may be generated by using the identifier of the user equipment as seed.

A time unit including a transmission time section of the sequence and a time section of the scheduled resource area within the unlicensed band corresponds to $L \times (1/N)$ (wherein N is an integer and not equal to 0), and wherein L may correspond to a subframe length within the licensed band.

The value N may be decided based upon a number of user equipments being scheduled by the base station over the unlicensed band.

The transmission time section of the sequence and the time section of the scheduled resource area may be continuous.

Effects of the Invention

According to the present invention, a frequency band such as an unlicensed band may be efficiently operated with minimum overhead.

The effects that may be gained from the embodiment of the present invention will not be limited only to the effects described above. Accordingly, other effects of the present application, which are not mentioned herein, will become apparent to those having ordinary skill in the art.

BRIEF DESCRIPTION OF THE DRAWINGS

FIG. 9 illustrates a PUCCH channel structure using block dispersion.

FIG. 10 illustrates a block view showing the structure of a wireless communication system having multiple antennae.

FIG. 11 illustrates a downlink reference signal.

MODE FOR CARRYING OUT THE PRESENT INVENTION

Figure 1:
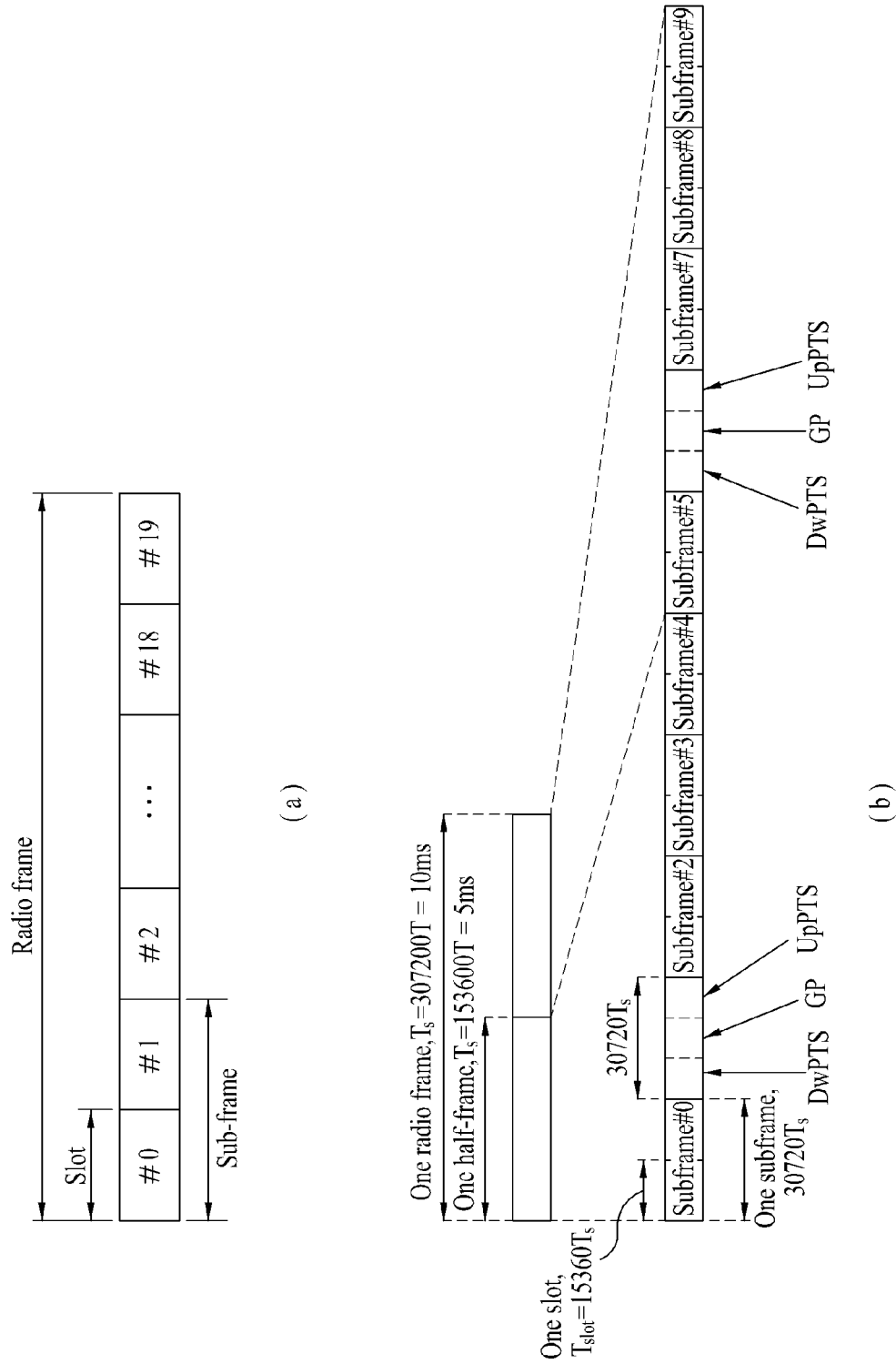
FIG. 1 illustrates an exemplary structure of a radio frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between the base station and the terminal (or user equipment). Herein, the base station may refer to a terminal node of the network that performs direct communication with the terminal. Occasionally, in the description of the present invention, particular operations of the present invention that are described as being performed by the base station may also be performed by an upper node of the base station.

More specifically, in a network consisting of multiple network nodes including the base station, it is apparent that diverse operations that are performed in order to communicate with the terminal may be performed by the base station or b network nodes other than the base station. Herein, the term 'Base Station (BS)' may be replaced by other terms, such as fixed station, Node B, eNode B (eNB), Access Point (AP), and so on. Also, in the description of the present invention, the term base station may also be used as a term including the concept of a cell or sector. Meanwhile, the term 'relay' may be replaced by terms including Relay Node (RN), Relay Station (RS), and so on. And, the term 'Terminal' may be replaced by terms including UE (User Equipment), MS (Mobile Station), MSS (Mobile Subscriber Station), SS (Subscriber Station), and so on.

The specific terms used in the following description of the present invention are provided to facilitate the understanding of the present invention. And, therefore, without deviating from the technical scope and spirit of the present invention, such specific terms may also be varied and/or replaced by other terms.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system. The WiMAX may be described based upon the IEEE 802.16e standard (WirelessMAN-OFDMA Reference System) and the evolved IEEE 802.16m standard (WirelessMAN-OFDMA Advanced system). For the clarity in the description of the present invention, the present invention will be described based upon the 3GPP LTE system and the 3GPP LTE-A system. Nevertheless, the scope and spirit of the present invention will not be limited only to those of the 3GPP LTE system and the 3GPP LTE-A system.

FIG. 1 illustrates an exemplary structure of a wireless (or radio) frame being used in a 3GPP LTE system. Referring to FIG. 1(a), one wireless (or radio) frame includes 10 sub-frames, and one sub-frame includes 2 slots in a time domain. The time for transmitting one sub-frame is defined as a Transmission Time Interval (TTI). For example, one sub-frame may have the length of 1 ms, and one slot may have the length of 0.5 ms. One slot may include a plurality of OFDM symbols in the time domain. Since the 3GPP LTE system uses the OFDMA method during a downlink, the OFDM symbol may indicate one symbol length (period). During an uplink, one symbol may be referred to as an SC-FDMA symbol or a symbol length. A Resource Block (RB) corresponds to a resource allocation unit, and, in a slot, the resource block (RB) includes a plurality of consecutive sub-carriers. However, the above-described wireless frame structure is merely exemplary. Therefore, the number of sub-frames included in a wireless frame, the number of slots included in one sub-frame, or the number of OFDM symbols being included in one slot may be varied in many different ways.

FIG. 1(b) illustrates the structure of a type 2 radio frame. The type 2 radio frame consists of 2 half frames, and each half frame consists of 5 subframes, a DwPTS (Downlink Pilot Time Slot), a Guard Period (GP), and an UpPTS (Uplink Pilot Time Slot). Herein, one subframe consists of 2 slots. The DwPTS is used for initial cell search, synchronization, or channel estimation performed by a user equipment. The UpPTS is used for channel estimation performed by a base station and for uplink transmission synchronization performed by the user equipment. The guard period corresponds to a period for eliminating interference occurring in an uplink due to a multiple path delay of a downlink signal between an uplink and a downlink.

Herein, the structure of a radio frame is merely exemplary, and the number of subframes being included in a radio frame or a number of slots being included in a subframe, a number of symbols being included in a slot may be diversely varied.

Figure 2:
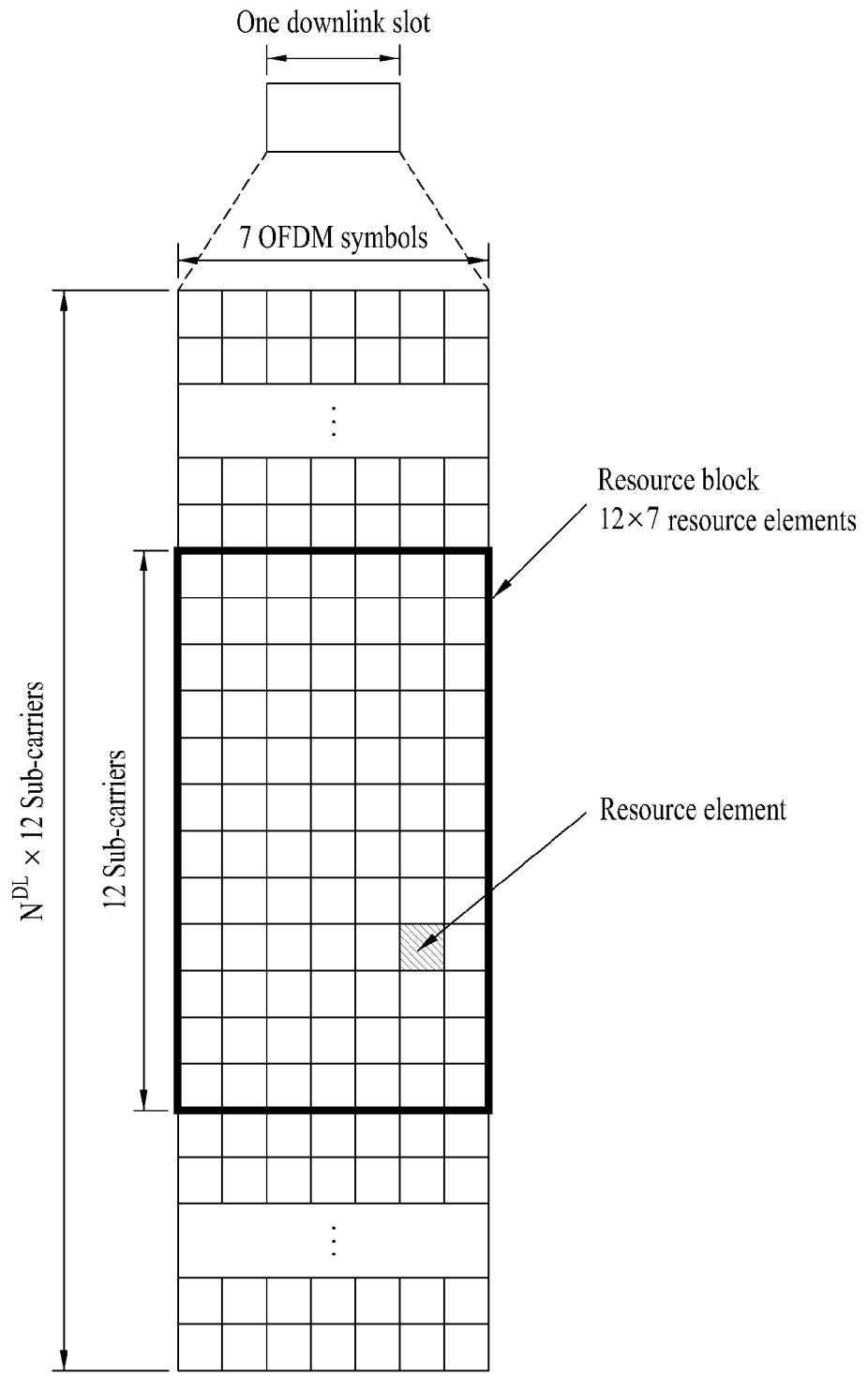
FIG. 2 illustrates an exemplary resource grid in a downlink slot.

FIG. 2 illustrates a resource grid of a downlink slot. Although it is shown in FIG. 2 that one downlink slot includes 7 OFDM symbols in a time domain, and that one resource block (RB) includes 12 sub-carriers in a frequency domain, this is merely exemplary. And, therefore, the present invention will not be limited only to the example presented in FIG. 2. For example, in case of a general Cyclic Prefix (CP), one slot includes 7 OFDM symbols. Alternatively, in case of an extended Cyclic Prefix (extended-CP), one slot may include 6 OFDM symbols. Referring to FIG. 2, each element configuring the resource grid is referred to as a resource element. One resource block includes 12×7 resource elements. An NDL number of resource blocks included in a downlink slot may vary in accordance with a downlink transmission bandwidth. The structure of an uplink slot may be identical to the above-described structure of the downlink slot.

Figure 3:
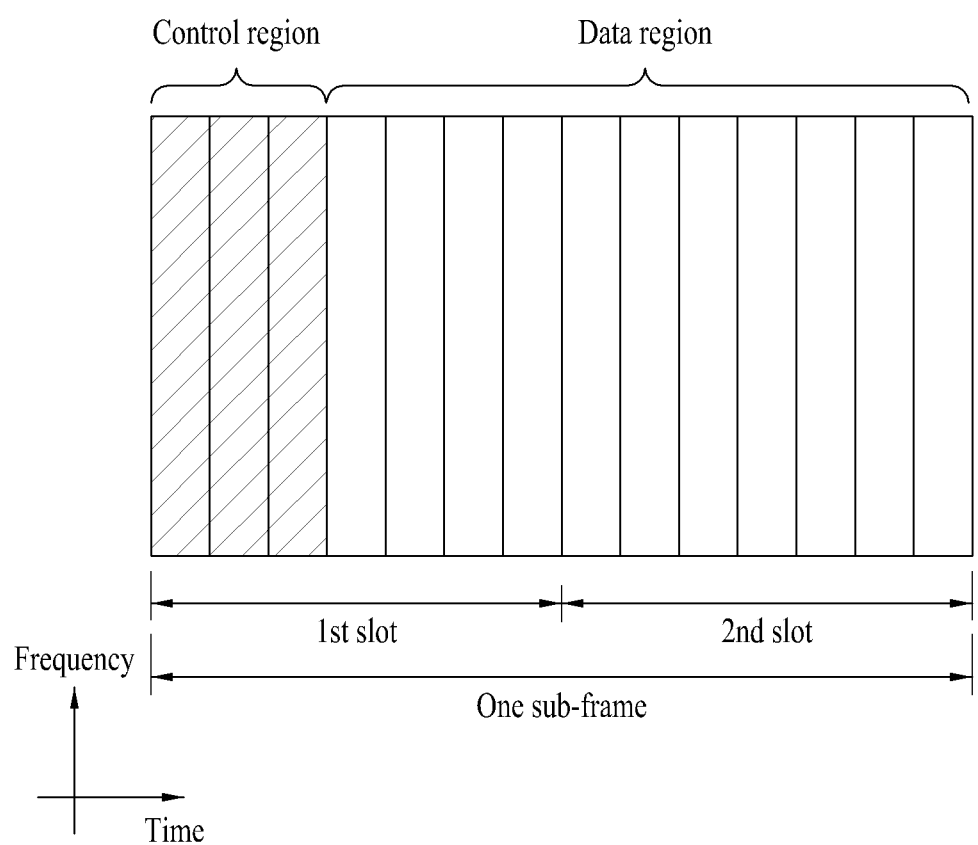
FIG. 3 illustrates a structure of a downlink subframe.

FIG. 3 illustrates an exemplary structure of a downlink sub-frame. A maximum of 3 OFDM symbols located at the front portion of a first slot within one sub-frame corresponds to a control region wherein a control channel is allocated (or assigned). The remaining OFDM symbols correspond to a data region wherein a Physical Downlink Shared Channel (PDSCH) is assigned. Downlink control channels that are being used in the 3GPP LTE system may include a Physical Control Format Indicator Channel (PCFICH), a Physical Downlink Control Channel (PDCCH), a Physical Hybrid automatic repeat request Indicator Channel (PHICH), and so on.

The PCFICH includes information on the number of OFDM symbols being transmitted from the first OFDM symbol of a sub-frame and being used in the control channel transmission within the sub-frame.

As a response to an uplink transmission, the PHICH includes HARQ ACK/NACK signals.

The control information being transmitted through the PDCCH is referred to as Downlink Control Information (DCI). Herein, the DCI may include uplink or downlink scheduling information or may include an uplink transmission power control command on a random terminal (or user equipment) group. The PDCCH may include information on resource allocation and transmission format of a downlink shared channel (DL-SCH), information on resource allocation of an uplink shared channel (UL-SCH), paging information of a paging channel (PCH), system information of the DL-SCH, resource allocation of an upper layer (or higher level) control message, such as a Random Access Response, that is being transmitted over the PDSCH, a set of transmission power control commands on individual user equipments within the random user equipment group, transmission power control information, information on the activation of a Voice over IP (VoIP), and so on. A plurality of PDCCHs may be transmitted within the control region. And, the user equipment may monitor the plurality of PDCCHs. Herein, the PDCCH may be transmitted in the form of a combination of at least one or more consecutive Control Channel Elements (CCEs). A CCE corresponds to a logical allocation unit used for providing a PDCCH at a coding rate based on a wireless channel state. Herein, the CCR corresponds to a plurality of resource element groups. The number of formats and available data bits of a PDCCH may be decided based upon a correlation between the number of CCEs and the coding rate provided by the CCEs. The base station decides a PDCCH format in accordance with the DCI being transmitted to the user equipment and adds a (Cyclic Redundancy Check; CRC) to the control information. Depending upon the owner or purpose of the PDCCH, the CRC may be masked by a Radio Network Temporary Identifier (RNTI). If the PDCCH belongs to a particular (or specific) user equipment, a cell-RNTI (C-RNTI) identifier of the user equipment may be masked to the CRC. Alternatively, if the PDCCH belongs to a paging message, a Paging Indicator Identifier (P-RNTI) may be masked to the CRC. If the PDCCH belongs to a system information (more specifically, a system information block (SIB)), a system information identifier, and a system information RNTI (SI-RNTI) may be masked to the CRC. In order to indicate the random access response, which corresponds to a response to the transmission of a random access preamble, of the user equipment, a random access RNTI (RA-RNTI) may be masked to the CRC.

PDCCH Processing

When mapping the PDCCH to the REs, a control channel element (CCE), which corresponds to a continuous (or contiguous) logical allocation unit. One CCE includes multiple (e.g., 9) resource element groups (REGs), and one REG consists of four neighboring REs in a state where the reference signal (RS) is excluded.

The number of CCEs required for a specific PDCCH may vary depending upon a DCI payload, which corresponds to the size of the control information, a cell bandwidth, channel coding rate, and so on. More specifically, the number of CCEs required for a specific PDCCH may be defined in accordance with a PDCCH format shown below in Table 1.

TABLE 1

| PDCCH Format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As described above, any one of the four formats may be used as the PDCCH, yet this is not notified to the user equipment (or terminal). Therefore, in case of the user equipment, the user equipment is required to perform decoding without knowing the PDCCH format, and this is referred to as blind decoding. However, since decoding all available CCEs for the uplink within respect to each PDCCH format may act as a heavy burden for the user equipment, a Search Space is defined based upon restrictions on a scheduler and number of decoding attempts.

More specifically, the search space corresponds to a group of candidate PDCCHs, each consisting of CCEs that the user equipment is intended to attempt decoding within an Aggregation Level. Herein, the aggregation levels and the number of PDCCH candidates may be defined as shown below in Table 2.

TABLE 2

| | Search Space | | Number of PDCCH |
|---|---|---|---|
| | Aggregation Level | Size (CCE unit) | Candidates |
| User Equipment Specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 2, since 4 different aggregation levels exist, the user equipment may have multiple search spaces with respect to each aggregation level. Additionally, as shown in Table 2, the search space may be divided into a user equipment specific (UE-specific) search space and a common search space. The UE-specific search space corresponds to a search space designated to specific user equipment. And, herein, each user equipment may monitor the UE-specific search space (attempt decoding on a PDCCH candidate group in accordance with an available DCI format), so as to verify the RNTI and CRC being masked to the PDCCH, thereby acquiring control information in case the verified RNTI and CRC are valid.

The common search space is designated for a case when multiple user equipments or all user equipments are to receive the PDCCH, such as dynamic scheduling or paging messages, and so on, respective to system information. However, the common search space may be used for a specific user equipment during resource management. Additionally, the common search space may also be overlapped with the UE-specific space. As described above, the user equipment attempts to perform decoding on the search space. And, herein, the number of such decoding attempts is decided by a Transmission mode, which is decided by a DCI format and RRC signaling. In case carrier aggregation is not applied, since the user equipment is required to consider two different DCI sizes (DCI format 0/1A/3/3A and DCI format 1C) respective to each of the 6 PDCCH candidates, the user equipment is required to perform a maximum of 12 decoding attempts. Since two different DCI format sizes are taken into considered with respect to the number of PDCCH candidates (6+6+2+2+2=16) for the UE-specific search space, a maximum of 32 decoding attempts are required to be performed. Therefore, in case carrier aggregation is not applied, a maximum of 44 decoding attempts are required to be performed.

Figure 4:
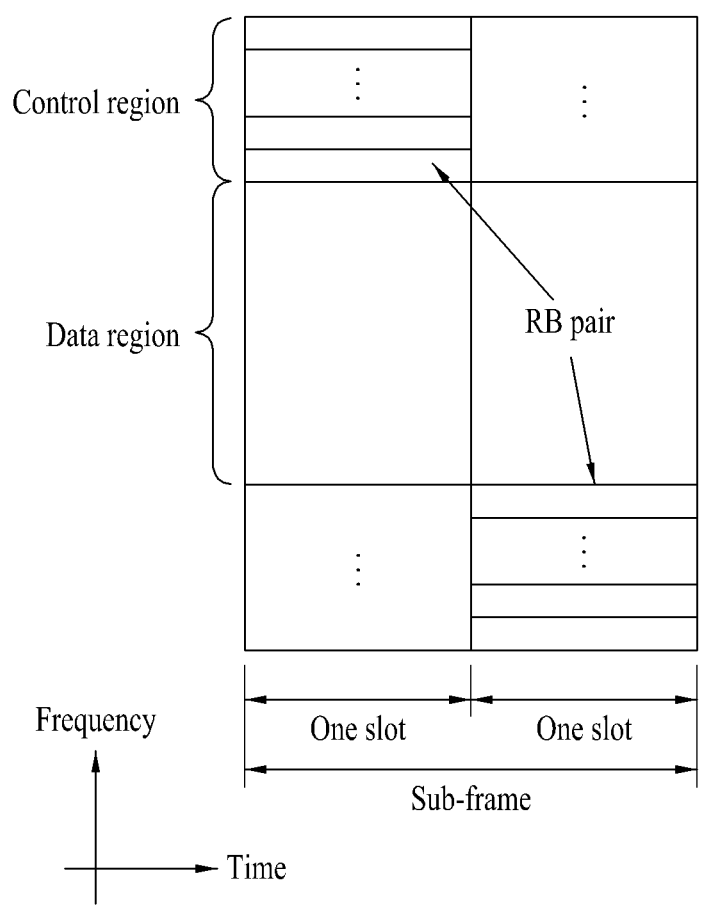
FIG. 4 illustrates a structure of an uplink subframe.

FIG. 4 illustrates an exemplary structure of an uplink sub-frame. In a frequency domain, an uplink sub-frame may be divided into a control region and a data region. A Physical Uplink Control Channel (PUCCH) including uplink control information is allocated to the control region. And, a Physical uplink shared channel (PUSCH) including user data is allocated to the data region. In order to maintain the characteristic of a unique (or single) carrier, one user equipment does not transmit the PUCCH and the PUSCH at the same time. The PUCCH for a user equipment is allocated to a resource block pair (RB pair) within a sub-frame. Each of the resource blocks (RBs) belonging to the RB pair occupies a different sub-carrier for 2 slots. This state may be referred to as the resource block pair, which is allocated to the PUCCH, as being frequency-hopped at the slot boundary.

Physical Uplink Control Channel (PUCCH)

The uplink control information (UCI), which is being transmitted through the PUCCH, may include a Scheduling Request (SR), HARQ ACK/NACK information, and downlink channel measurement information.

The HARQ ACK/NACK information may be generated based upon whether or not decoding of a downlink data packet within a PDSCH has been successfully performed. In the conventional wireless communication system, 1 bit is transmitted as ACK/NACK information with respect to a downlink single codeword transmission, and 2 bits are transmitted as ACK/NACK information with respect to a downlink 2-codeword transmission.

The channel measurement information indicates feedback information related to a Multiple Input Multiple Output (MIMO) method, and the channel measurement information may include a Channel Quality Indicator (CQI), a Precoding Matrix Index (PMI), and a Rank Indicator (RI). Such channel measurement information may be collectively referred to as CQI. 20 bits per subframe may be used for the CQI transmission.

The PUCCH may be modulated by using a BPSK (Binary Phase Shift Keying) scheme and a QPSK (Quadrature Phase Shift Keying) scheme. Control information of multiple user equipments may be transmitted through the PUCCH, and, when performing Code Division Multiplexing (CDM) in order to identify (or differentiate) the signal of each user equipment, 12 CAZAC (Constant Amplitude Zero Autocorrelation) sequences are mainly used. Since a CAZAC sequence has the characteristic of maintaining a constant amplitude in a time domain and a frequency domain, the CAZAC sequence is most appropriate for decreasing a PAPR (Peak-to-Average Power Ratio) or CM (Cubic Metric) of a user equipment so as to increase the coverage. Also, ACK/NACK information respective to a downlink data transmission, the information being transmitted through the PUCCH, may be covered by using an orthogonal sequence.

Also, control information that is being transmitted over the PUCCH may be identified (or differentiated from one another) by using a cyclically shifted sequence including different cyclic shift values. The cyclically shifted sequence may be generated by cyclically shifting a base sequence as much as a specific CS amount (cyclic shift amount). The specific CS amount is indicated by a cyclic shift (CS) index. A number of available cyclic shifts may be varied depending upon a delay spread of a channel. Various types of sequences may be used as the base sequence, and one of the examples corresponds to the above-described CAZAC sequence.

Additionally, the amount of control information that can be transmitted by the user equipment from a single subframe may be decided in accordance with a number of SC-FDMA symbols available for the transmission of the control information (i.e., SC-FDMA symbols excluding the SC-FDMA symbols being used for reference signal (RS) transmission for a coherent detection of the PUCCH).

PUCCH format 1 is used for SR single transmission. In case of the single transmission of the SR, a non-modulated wave is applied, and this will be described in more detail later on.

PUCCH format 1a or format 1b is used for HARQ ACK/NACK transmission. In case an HARQ ACK/NACK is exclusively transmitted from random subframe, PUCCH format 1a or format 1b may be used. Alternatively, by using PUCCH format 1a or format 1b, the HARQ ACK/NACK and the SR may be transmitted from the same subframe.

PUCCH format 2 is used for CQI transmission, and PUCCH format 2a/2b is used for CQI and HARQ ACK/NACK transmission. In case of an extended CP, PUCCH format 2 may be used for the transmission of the CQI and the HARQ ACK/NACK.

Figure 5:
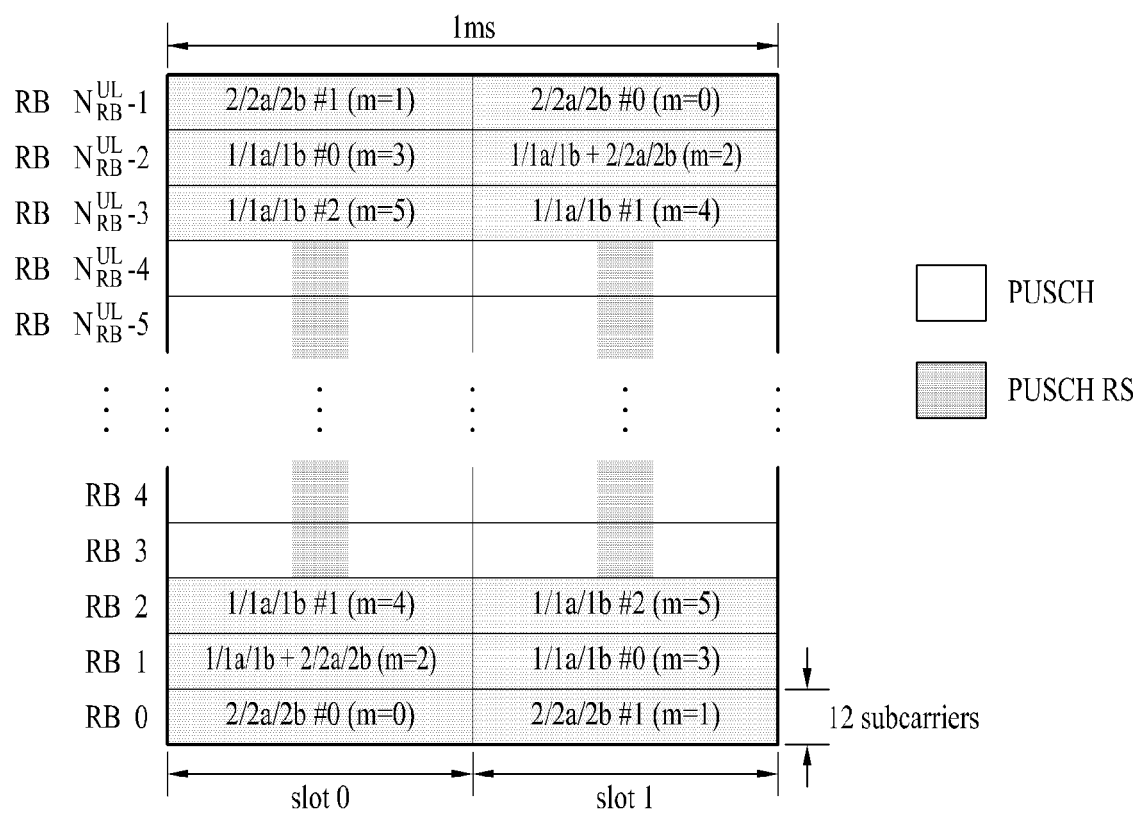
FIG. 5 illustrates a structure of PUCCH formats being mapped in an uplink physical resource block.
Figure 6:
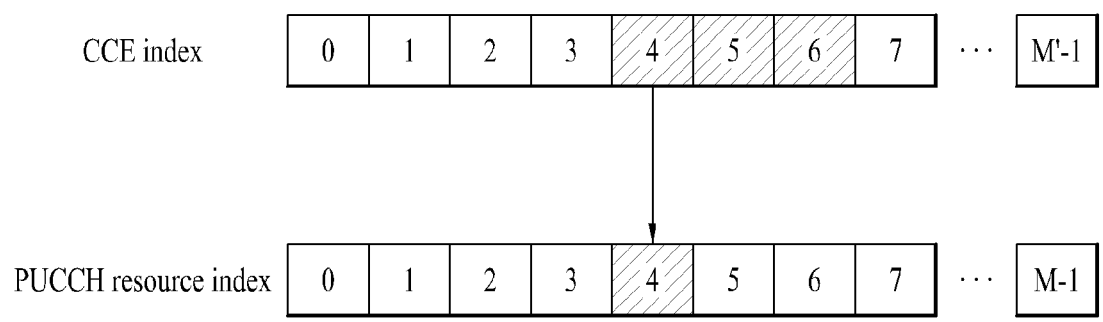
FIG. 6 illustrates an example of deciding a PUCCH resource for ACK/NACK.

FIG. 5 illustrates a structure of PUCCH formats being mapped to PUCCH regions in an uplink physical resource block. In FIG. 5, $N_{RB}^{UL}$ represents a number of resource blocks in an uplink, and $0, 1, \ldots N_{RB}^{UL}-1$ respectively indicate the number of the physical resource block. Basically, the PUCCH is mapped to each edge of an uplink frequency block. As shown in FIG. 6, PUCCH formats 2/2a/2b are mapped to PUCCH regions marked as m=0, 1, and this may indicate that the PUCCH formats 2/2a/2b are mapped to resource blocks located in a band-edge. Additionally, PUCCH formats 2/2a/2b and PUCCH formats 1/1a/1b may be mixed and mapped to PUCCH regions marked as m=2. Thereafter, PUCCH formats 1/1a/1b may be mapped to PUCCH regions marked as m=3, 4, 5. The number of PUCCH RBs ($N_{RB}^{(2)}$) that are available by PUCCH formats 2/2a/2b may be designated to the user equipments existing in the cell via broadcasting signaling.

PUCCH Resource

The UE is allocated with PUCCH resource, which is allocated for the transmission of uplink control information (UCI), from the base station by an explicit method or an implicit method via higher layer signaling.

In case of the ACK/NACK, multiple PUCCH resource candidates may be set up by a higher layer within respect to the user equipment, and which one of such multiple resource PUCCH candidates is to be used may be decided by an implicit method. For example, the UE may receive a PDSCH from the BS, and an ACK/NACK respective to the corresponding data unit may be transmitted through a PUCCH resource, which is implicitly decided by a PDCCH resource carrying (or transporting) scheduling information respective to the PDSCH.

FIG. 6 illustrates an example of deciding a PUCCH resource for ACK/NACK. In the LTE system, a PUCCH resource for the ACK/NACK is not assigned (or allocated) to each UE in advance, and, instead, the multiple UEs respectively divide the multiple PUCCH resources at each time point. More specifically, the PUCCH resource used by the UE for transmitting the ACK/NACK is decided by using an implicit method based upon a PDCCH, which carries and delivers scheduling information on the respective downlink data. The entire region, wherein the PDCCH is transmitted from each downlink subframe, is configured of multiple CCEs (Control Channel Elements), and the PDCCH being transmitted to the UE is configured of one or more CCEs. The CCE includes multiple (e.g., 9) REGs (Resource Element Groups). And, one REG is configured of four neighboring REs (Resource Elements) in a state where the Reference Signal (RS) is excluded. The UE transmits an ACK/NACK through an implicit PUCCH resource, which is derived or calculated from a function of a specific CCE index (e.g., first or lowest CCE index), among indexes of the CCEs configuring the PDCCH, which is received by the UE.

Referring to FIG. 6, each PUCCH index corresponds to a PUCCH resource for the ACK/NACK. As shown in FIG. 6, when it is assumed that scheduling information on a PDSCH is being transmitted (or delivered) to the UE through a PDCCH, which is configured of CCE numbers 4~6, the UE transmits the ACK/NACK to the BS through a PUCCH, e.g. PUCCH number 4, that is derived or calculated from an index of CCE number 4, which corresponds to the lowest CCE configuring the PDCCH. FIG. 6 illustrates an exemplary case where a maximum M' number of CCEs exist in the DL, and where a maximum of M number of PUCCHs exists in the UL CC. Although M' may be equal to M (M'=M), the M' value and the M value may be differently set-up, and the mapping of the CCEs and the PUCCHs may be set to overlap one another.

For example, a PUCCH resource index may be decided as shown below.

$$n_{PUCCH}^{(1)} = n_{CCE} + N_{PUCCH}^{(1)} \qquad \text{[Equation 15]}$$

Herein, n(1)PUCCH represents a PUCCH resource index for transmitting the ACK/NACK, and N(1)PUCCH indicates a signaling value received from an upper layer. And, nCCE represents a smallest value among a CCE index used in a PDCCH transmission. Hereinafter, the PUCCH will be described in more detail.

PUCCH Channel Structure

The PUCCH formats 1a and 1b will hereinafter be described in detail.

In the PUCCH formats 1a/1b, a symbol that is modulated by using the BPSK or QPSK modulation schemes is multiplied a length-12 CAZAC sequence. For example, a result of multiplying a modulation symbol d(0) by an N-length CAZAC sequence r(n) (n=0, 1, 2, ..., N−1) corresponds to y(0), y(1), y(2), ..., y(N−1). The y(0), y(1), y(2), ..., y(N−1) symbols may be collectively referred to as a block of symbols.

After multiplying the modulation symbol by the CAZAC sequence, a block-wise dispersion using an orthogonal sequence is applied.

A length-4 Hadamard sequence is used for a general ACK/NACK information, and a length-3 DFT (Discrete Fourier Transform) sequence is used for a shortened ACK/NACK information and a Reference Signal information. In case of an extended CP, a length-2 Hadamard sequence may be used on the reference signal.

Figure 7:
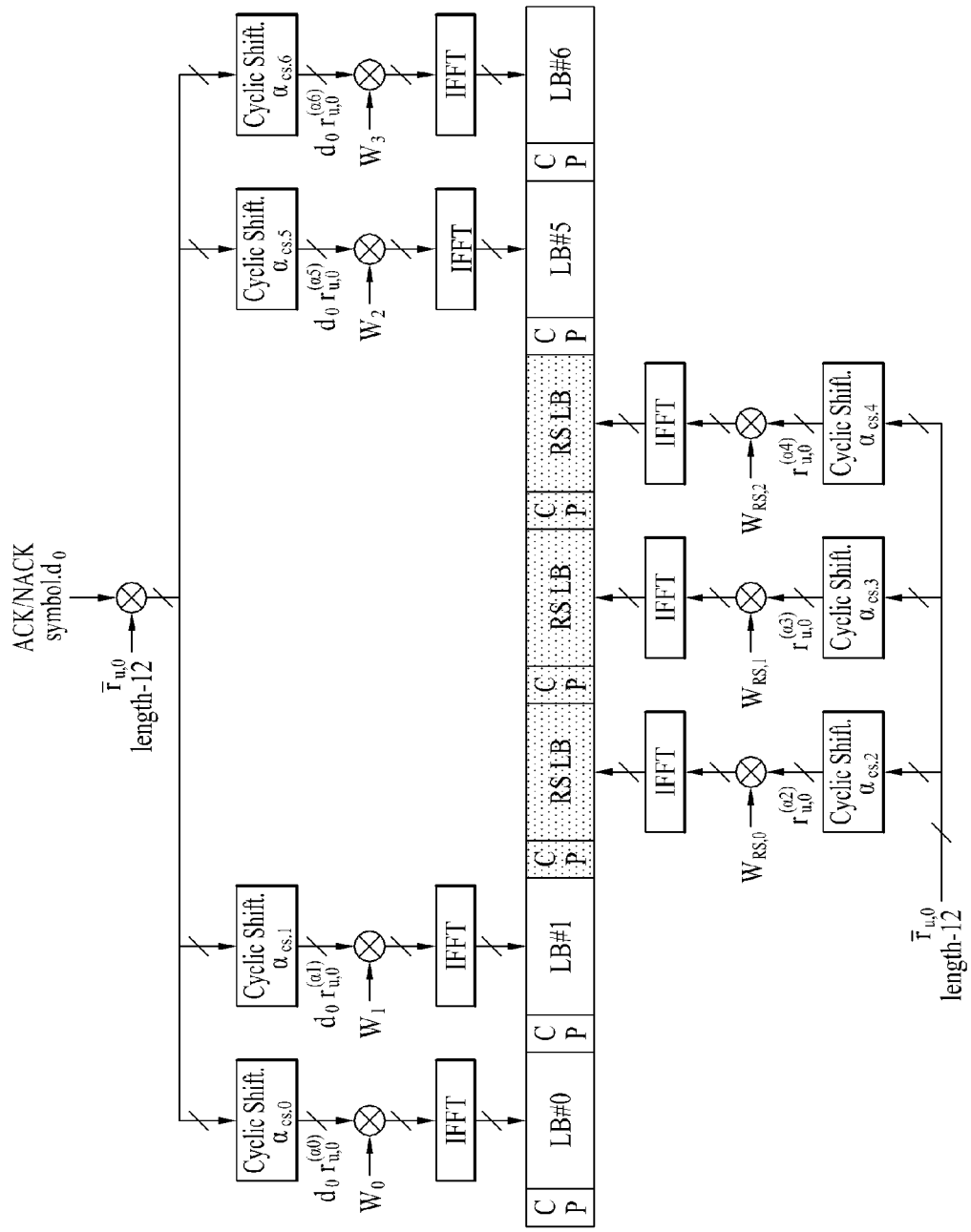
FIG. 7 illustrates a structure of an ACK/NACK channel in case of a normal CP.

FIG. 7 illustrates an exemplary structure of an ACK/NACK channel in case of a normal CP. FIG. 7 shows an exemplary PUCCH channel structure for performing HARQ ACK/NACK transmission without any CQI. Among the 7 SC-FDMA symbols that are included in one slot, 3 consecutive (or contiguous) symbols located in the middle portion of the 7 SC-FDMA symbols may carry a reference signal (RS), and the remaining 4 SC-FDMA symbols may carry an ACK/NACK signal. Meanwhile, in case of the extended CP, an RS may be carried in 2 consecutive symbols located in the middle. The number of symbols that are used for the RS and the positions of the corresponding symbols may vary depending upon the control channel.

1-bit and 2-bit ACK/NACK information (being in an unscrambled state) may be expressed as a single HARQ ACK/NACK modulation symbol by respectively using BPSK and QPSK modulation methods. The ACK may be encoded as '1', and the NACK may be encoded as '0'.

When transmitting a control signal within an assigned band, a 2-dimesional dispersion is applied in order to enhance the multiplexing capacity. More specifically, in order to increase the number of user equipments or in order to increase the number of control channels, frequency domain dispersion and time domain dispersion may be applied at the same time. In order to distribute (or disperse) the ACK/NACK signal in the frequency domain, a frequency domain sequence may be used as the basic sequence. Among the CAZAC sequences, a Zadoff-Chu (ZC) sequence may be used as the frequency domain sequence. For example, by applying different Cyclic Shifts (CSs) to the ZC sequence, which corresponds to a basic (or essential) sequence, the multiplexing of different user equipment or different control channels may be applied. The number of CS resources being supported by the SC-FDMA symbol for PUCCH RBs for the HARQ ACK/NACK transmission may be set up (or determined) by a cell-specific higher-layer signaling parameter ($\Delta_{shift}^{PUCC}$), and $\Delta_{shift}^{PUCCH}$ □{1, 2, 3} respectively represents 12, 6, or 4 shifts.

The frequency domain dispersed ACK/NACK signal is disperse in the time domain by using an orthogonal spreading code. Herein, a Walsh-Hadamard sequence or a DFT sequence may be used as the orthogonal spreading code. For example, the ACK/NACK signal may be dispersed by using a length-4 orthogonal sequence (w0, w1, w2, w3) with respect to 4 symbols. Additionally, the RS is also dispersed through a length-3 orthogonal sequence. This is referred to as Orthogonal Covering (OC).

By using an OC resource in the frequency domain and an OC resource in the time domain, as described above, multiple user equipment may be multiplexed by using a Code Division Multiplex (CDM) method. More specifically, the ACK/NACK information and RS of a large number of user equipments may be multiplexed within the same PUCCH RB.

With respect to such time domain dispersion CDM, the number of dispersion codes being supported with respect to the ACK/NACK information is limited by the number of RS symbols. More specifically, since the number of RS transmission SC-FDMA symbols is smaller than the number of ACK/NACK information transmission SC-FDMA symbols, the multiplexing capacity of the RS is smaller than the multiplexing capacity of the ACK/NACK information. For example, in case of the normal CP, the ACK/NACK information may be transmitted from 4 symbols. Herein, 3 orthogonal dispersion codes are used for the ACK/NACK information instead of 4 orthogonal dispersion codes, and this is because the number of RS transmission symbols is limited to 3, and, therefore, only 3 orthogonal dispersion codes may be used for the corresponding RS.

Examples of the sequences that are used for the dispersion of ACK/NACK information are shown in Table 3 and Table 4. Herein, Table 3 shows a sequence for a length-4 symbol, and Table 4 shows a sequence for a length-3 sequence. The sequence for the length-4 symbol is used in PUCCH formats 1/1a/1b corresponding to a general subframe configuration. Based upon a case of an SRS (Sounding Reference Signal) being transmitted from the last symbol of a second slot, within the subframe configuration, the sequence for the length-4 symbol is applied in the first slot, and a shortened PUCCH format 1/1A/1B of the sequence for the length-3 symbol may be applied in the second slot.

TABLE 3

| Sequence index | {w(0), w(1), w(2), w(3)} |
|---|---|
| 0 | [+1 +1 +1 +1] |
| 1 | [+1 −1 +1 −1] |
| 2 | [+1 −1 −1 +1] |

TABLE 4

| Sequence index | {w(0), w(1), w(2)} |
|---|---|
| F0 | [1 1 1] |
| 1 | [1 $e^{j2\pi/3}$ $e^{j4\pi/3}$] |
| 2 | [1 $e^{j4\pi/3}$ $e^{j2\pi/3}$] |

Meanwhile, the example of the orthogonal sequence being used for the RS dispersion of the ACK/NACK channel is as shown below in Table 4.

TABLE 4

| Sequence index | Normal CP | Extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

In the subframe of a normal CP, when 3 symbols are used for the RS transmission in a single slot, and when 4 symbols are used for the ACK/NACK information transmission, for example, when 6 cyclic shifts (CSs) can be used in the frequency domain, and when 3 orthogonal covering (OC) resources can be used in the time domain, HARQ ACK/NACK from a total of 18 different user equipments may be multiplexed within a single PUCCH RB. In an extended CP, if 2 symbols are used for the RS transmission, and if 4 symbols are used for the ACK/NACK information transmission, within a single slot, for example, when 6 cyclic shifts (CSs) can be used in the frequency domain, and when 2 orthogonal covering (OC) resources can be used in the time domain, HARQ ACK/NACK from a total of 12 different user equipments may be multiplexed within a single PUCCH RB.

Hereinafter, the PUCCH format 1 will be described in detail. A Scheduling Request (SR) is transmitted by a user equipment, which sends a request to be scheduled or which does not send a request to be scheduled. An SR channel reuses the ACK/NACK channel structure of PUCCH formats 1a/1b, and the SR channel is configured by using an OOK (On-Off Keying) method based upon an ACK/NACK channel design. In the SR channel, a reference signal is not transmitted. Therefore, in case of a normal CP, a length-7 sequence is used, and, in case of an extended CP, a length-6 sequence is used. Herein, different cyclic shifts or orthogonal covers may be assigned to the SR and the ACK/NACK. In order to transmit a positive SR, the user equipment transmits an HARQ ACK/NACK through an assigned resource dedicated to an SR. In order to transmit a negative SR, the user equipment transmits an HARQ ACK/NACK through an assigned resource dedicated to an ACK/NACK.

Hereinafter, the PUCCH formats 2/2a/2b will be described in detail. Herein, each of the PUCCH formats 2/2a/2b corresponds to a control channel that is used for transmitting channel measurement feedback (CQI, PMI, RI).

A frequency unit (or frequency resolution) corresponding to a reporting cycle and measurement subject of channel measurement feedback (hereinafter collectively referred to as CQI information), may be controlled by the base station. In the time domain, periodic and aperiodic CQI reporting may be supported. PUCCH format 2 may be used only for the periodic reporting, and a PUSCH may be used for the aperiodic reporting. In case of the aperiodic reporting, the base station may direct the user equipment to load individual CQI reports on resources, which are scheduled for the uplink data transmission, and to transmit the processed resources.

Figure 8:
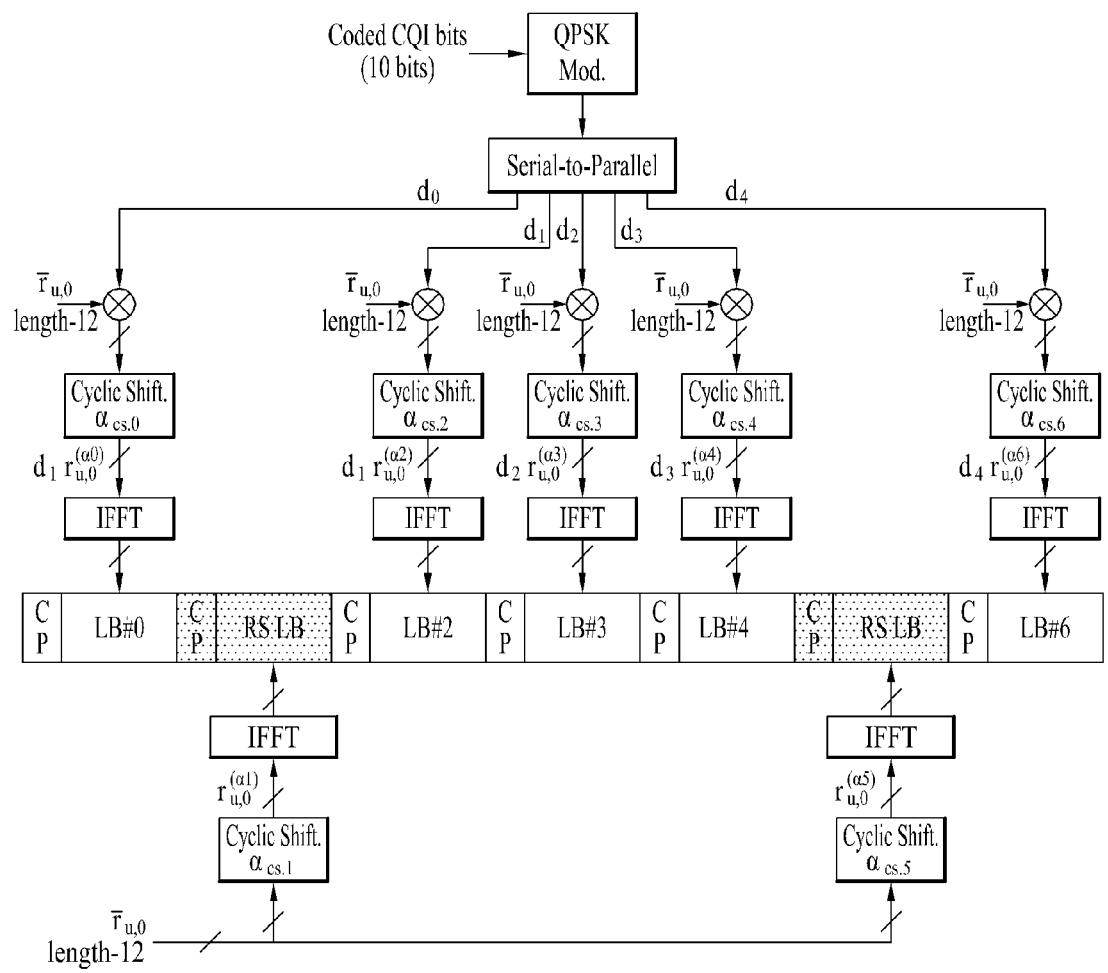
FIG. 8 illustrates a structure of a CQI channel in case of a normal CP.

FIG. 8 illustrates a structure of a CQI channel in case of a normal CP. Among the SC-FDMA symbols 0 to 6 of a single slot, SC-FDMA symbols 1 and 5 ($2^{nd}$ and $6^{th}$ symbols) are used for Demodulation Reference Signal (DMRS) transmission, and the CQI information may be transmitted from the remaining SC-FDMA symbols. Meanwhile, in case of the extended CP, one SC-FDMA symbols (SC-FDMA symbol 3) is used for the DMRS transmission.

The PUCCH formats 2/2a/2b support modulation performed by using CAZAC sequences. And, the QPSK-modulated symbol is multiplied by a length-12 CAZAC sequence. The cyclic shift of the sequence may vary between symbols and slots. Herein, orthogonal covering is used for DMRS.

Among 7 SC-FDMA symbols included in a single slot, a reference signal (DMRS) is carried over 2 SC-FDMA symbols, which are spaced apart from one another by an interval of 3 SC-FDMA symbols. And, CQI information is carried over the remaining 5 SC-FDMA symbols. 2 RSs are used in a single slot in order to support a high-speed user equipment. Also, each user equipment may be differentiated from one another by using a sequence. The CQI information symbols are modulated to the entire SC-FMDA symbols, so as to be transmitted. And, herein, the SC-FDMA symbol is configured of one sequence. More specifically, the user equipment modulates the CQI to each sequence, so as to transmit the CQI.

Herein, 10 symbols may be transmitted to a single TTI, and the modulation of the CQI information is decided to up to QPSK. When using QPSK mapping on the SC-FDMA symbols, 2-bit CQI values may be loaded (or carried). Therefore, a 10-bit CQI value may be carried over one slot. Therefore, one subframe may carry a maximum CQI value of 20 bits. In order to disperse the CQI information in the frequency domain, frequency domain dispersion code is used.

A length-12 CAZAC sequence (e.g., ZC sequence) may be used as the frequency domain dispersion code. Each control channel may be differentiated from one another by applying CAZAC sequences each having a different cyclic shift value. Herein, IFFT is performed on the frequency domain dispersed CQI information.

Due to a cyclic shift having 12 equal intervals, 12 different user equipments may be orthogonally multiplexed over the same PUCCH RB. In case of a normal CP, although the DMRS sequence within SC-FDMA symbols 1 and 5 (within SC-FDMA symbol 3 in case of an extended CP) is similar to the CQI signal sequence, modulation similar to that of the CQI information is not applied to the DMRS sequence. The user equipment may be semi-statically set up by higher layer signaling, so that the user equipment can report different CQI, PMI, and RI types within a PUCCH resource, which is designated by a PUCCH resource index ($n_{PUCCH}^{(2)}$). Herein, the PUCCH resource index ($n_{PUCCH}^{(2)}$) corresponds to information indicating a PUCCH region, which is used for the PUCCH format 2/2a/2b, and a cyclic shift (CS) value that is to be used.

Hereinafter, an enhanced-PUCCH (e-PUCCH) format will be described in detail. The e-PUCCH may correspond to PUCCH format 3 of an LTE-A system. A block spreading method may be applied in an ACK/NACK transmission using PUCCH format 3.

Unlike in the conventional PUCCH format 1 group or format 2 group, the block dispersion method corresponds to a method of modulating the control signal transmission by using an SC-FDMA method (or scheme). As shown in FIG. 9, the symbol sequence may be dispersed within the time domain by using an Orthogonal Cover Code (OCC), thereby being transmitted. By using the OCC, the control signals of multiple user equipments may be multiplexed within the same RB. In case of the above-described PUCCH format 2, one symbol sequence is transmitted throughout the time domain, and the control signals of multiple user equipments are multiplexed by using a CS (cyclic shift) of a CAZAC sequence. On the other hand, in case of a block dispersion based PUCCH format (e.g., PUCCH format 3), one symbol sequence is transmitted throughout the frequency domain, and the control signals of multiple user equipments are multiplexed by using a time domain dispersion using OCC.

FIG. 9($a$) illustrates an example of generating and transmitting 4 SC-FDMA symbols (i.e., data portions) by using an OCC of length=4 (or spreading factor (SF)=4) in a single symbol sequence during 1 slot. In this case, 3 RS symbols (i.e., RS portions) may be used during 1 slot.

Alternatively, FIG. 9($b$) illustrates an example of generating and transmitting 5 SC-FDMA symbols (i.e., data portions) by using an OCC of length=5 (or SF=5) in a single symbol sequence during 1 slot. In this case, 2 RS symbols (i.e., RS portions) may be used during 1 slot. As shown in the example of FIG. 9, the RS symbol may be generated from a CAZAC sequence having a specific cyclic shift value applied thereto, and the RS symbol may be transmitted in a format of having a predetermined OCC applied (or multiplied) throughout multiple RS symbols. Additionally, in the example shown in FIG. 9, when it is assumed that 12 modulation symbols are used for each OFDM symbol (or SC-FDMA symbol) and also assumed that each modulation symbol is generated by QPSK, a maximum number of bits that can be transmitted from one slot is equal to 12×2=24 bits. Therefore, a total of 48 can be transmitted from two slots. As described above, when a PUCCH channel structure of a block dispersion method is used, a more extended control information may be transmitted as compared to the conventional PUCCH format 1 group and format 2 group.

MIMO (Multi Input Multi Output)

FIG. 10 illustrates a block view showing the structure of a wireless communications system having multi antennae. As shown in FIG. 10(a), if the number of transmitting antennae is increased to NT, and if the number of receiving antennae is increased to NR, unlike in the case wherein multiple antennae are used only in the transmitter or the receiver, a logical channel transmission capacity increases in proportion with the number of antennae. Therefore, the transmission rate may be enhanced, and the frequency efficiency may be drastically enhanced. In accordance with the increase in the channel transmission capacity, the transmission rate may be increased as much as a value of a maximum transmission rate (Ro) multiplied by a rate increase ratio (Ri) when logically using a single antenna.

$$R_i = \min(N_T, N_R) \quad \text{[Equation 1]}$$

For example, a MIMO communications system using 4 transmitting antennae and 4 receiving antennae may theoretically gain a transmission rate 4 times greater than that of a single antenna system.

A communications method in a multi antennae system using mathematical modeling will now be described in detail. Herein, it is assumed that NT number of transmitting antennae and NR number of receiving antennae in the system.

Referring to a transmitted signal, when there is NT number of transmitting antennae, the maximum number of transmittable information is equal to NT. The transmission information may be expressed as shown below.

$$s = [s_1, s_2, \ldots, s_{N_T}]^T \quad \text{[Equation 2]}$$

Each of the transmission information $s_1, s_2, \ldots, s_{N_T}$ may have a different transmission power. When each of the transmission power is referred to as $P_1, P_2, \ldots, P_{N_T}$, the transmission information wherein the respective transmission power is adjusted may be expressed as shown below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Moreover, by using a diagonal matrix P of the transmission power, $\hat{S}$ may be expressed as shown below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Herein, consideration is made on a case wherein NT number of transmitted signals $x_1, x_2, \ldots, x_{n_T}$, which are configured by having a weight matrix W applied to an information vector Ŝ, wherein the transmission power is adjusted, so as to be actually transmitted. The weight matrix W performs the role of adequately distributing transmission information to each antenna in accordance with the transmission channel status. By using a vector X, $x^1 x_2, \ldots, x_{N_T}$ may be expressed as shown below.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Herein, $w_{ij}$ represents a weight between an $i^{th}$ transmitting antenna and a $j^{th}$ information. W may also be referred to as a precoding matrix.

When there are NR number of receiving antennae, the received signals $y_1, y_2, \ldots, y_{N_R}$ of may be expressed as a vector as shown below.

$$y = [y_1, y_2, \ldots, y_{N_R}]^T \quad \text{[Equation 6]}$$

In case of modeling a channel in a multi antennae wireless communication system, a channel may be differentiated (or identified) in accordance with a transmitting antenna index. Herein, a channel passing through receiving antenna i from transmitting antenna j will be expressed as $h_{ij}$. In $h_{ij}$, it should be noted that, in the index order, the receiving antenna index comes first, and the transmitting antenna index comes next. \

Meanwhile, FIG. 10(b) illustrates a channel from NT number of transmitting antennae to receiving antenna i. The channel may be grouped so as to be expressed in the form of a vector and a matrix. In FIG. 10(b), a channel starting from a total of NT number of transmitting antennae and being received to receiving antenna i may be expressed as shown below.

$$h_i^T = [h_{i1}, h_{i2}, \ldots, h_{iN_T}] \quad \text{[Equation 7]}$$

Therefore, all channels starting from NT number of transmitting antennae and being received to NR number of receiving antennae may be expressed as shown below.

$$H = \begin{bmatrix} h_1^T \\ h_2^T \\ \vdots \\ h_i^T \\ \vdots \\ h_{N_R}^T \end{bmatrix} \quad \text{[Equation 8]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}$$

An actual channel passes through a channel matrix H, and an AWGN (Additive White Gaussian Noise) is added to the processed channel. The AWGN (Additive White Gaussian Noise) $n_1, n_2, \ldots, n_{N_R}$ being added to each of the $N_R$ number of receiving antennae may be expressed as shown below.

$$n = [n_1, n_2, \ldots, n_{NR}]^T \quad \text{[Equation 9]}$$

A received signal may be expressed as shown below through the above-described equation modeling.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_R} \end{bmatrix} + \begin{bmatrix} n_1 \\ n_2 \\ \vdots \\ n_i \\ \vdots \\ n_{N_R} \end{bmatrix}$$

$$= Hx + n$$

[Equation 10]

Meanwhile, the number of rows and columns in a channel matrix H indicating the channel state may be decided by the number of transmitting and receiving antennae. The number of rows in the channel matrix H is equal to the number of receiving antennae NR, and the number of columns in the channel matrix H is equal to the number of transmitting antennae NT. More specifically, the channel matrix H corresponds to a matrix of NR×NT.

A rank of a matrix is defined as a minimum number among the number of rows or columns that are independent from one another. Therefore, the rank of a matrix cannot be greater than the number of rows or the number of columns. The rank (rank(H)) of the channel matrix H is limited as shown below.

$$\text{rank}(H) \leq \min(N_T, N_R) \quad \text{[Equation 11]}$$

Another definition of the rank may be defined as a number of Eigen values other than 0, when the matrix is processed with Eigen value decomposition. Similarly, yet another definition of the rank may be defined as a number of singular values other than 0, when the matrix is processed with a singular value decomposition. Therefore, in the channel matrix, the physical definition of a rank may correspond to a maximum number of information that can be transmitted from a given channel.

Reference Signal (RS)

In a radio communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas shall be detected in order to correctly receive the signal. Accordingly, each transmission antenna has an individual RS.

A downlink RS includes a Common RS (CRS) shared among all UEs in a cell and a Dedicated RS (DRS) for only a specific-UE. It is possible to provide information for channel estimation and demodulation using such RSs.

The receiving end (UE) estimates the channel state from the CRS and feeds back an indicator associated with channel quality, such as a Channel Quality Indicator (CQI), a Precoding Matrix Index (PMI) and/or a Rank Indicator (RI), to the transmission side (eNodeB). The CRS may be also called a cell-specific RS. Alternatively, an RS associated with the feedback of Channel State Information (CSI) such as CQI/PMI/RI may be separately defined as a CSI-RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DMRS).

FIG. 11 illustrates a pattern of CRSs and DRSs mapped on a downlink RB pair defined in the existing 3GPP LTE system (e.g., Release-8). The downlink RB pair as a mapping unit of the RSs may be expressed in units of one subframe on a time domain×12 subcarriers on a frequency domain. That is, on the time axis, one RB pair has a length of 14 OFDM symbols in case of the normal CP (FIG. 11(a)) and has a length of 12 OFDM symbols in case of the extended CP (FIG. 11(b)).

FIG. 11 shows the locations of the RSs on the RB in the system in which the eNodeB supports four transmission antennas. In FIG. 11, Resource Elements (REs) marked as '0', '1', '2' and '3' indicate the locations of the CRSs of the antenna port indexes 0, 1, 2 and 3, respectively. In FIG. 11, the RE marked as 'D' indicates the location of the DRS.

Cooperative Multi-Point (CoMP)

According to the improved system performance requirements of the 3GPP LTE-A system, CoMP transmission/reception technology (may be referred to as co-MIMO, collaborative MIMO or network MIMO) is proposed. The CoMP technology can increase the performance of the UE located on a cell edge and increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme (or method) may be applied.

The CoMP method applicable to the downlink may be largely classified into a Joint Processing (JP) method (or scheme) and a Coordinated Scheduling/Beamforming (CS/CB) method.

In the JP method, each point (eNodeB) of a CoMP unit may use data. The CoMP unit refers to a set of eNodeBs used in the CoMP method. The JP method may be classified into a joint transmission method and a dynamic cell selection method.

The joint transmission method refers to a method for transmitting a PDSCH from a plurality of points (a part or the whole of the CoMP unit). That is, data transmitted to a single UE may be simultaneously transmitted from a plurality of transmission points. According to the joint transmission method, it is possible to coherently or non-coherently improve the quality of the received signals and to actively eliminate interference with another UE.

The dynamic cell selection method refers to a method for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB method, the CoMP units may cooperatively perform beamforming of data transmission to a single UE. Although only a serving cell transmits the data, user scheduling/beamforming may be determined by the coordination of the cells of the CoMP unit.

In an uplink, coordinated multi-point reception refers to reception of a signal transmitted by coordination of a plurality of geographically separated points. The CoMP method applicable to the uplink may be classified into Joint Reception (JR) and Coordinated Scheduling/Beamforming (CS/CB).

The JR method indicates that a plurality of reception points receives a signal transmitted through a PUSCH, the CS/CB scheme indicates that only one point receives a PUSCH, and user scheduling/beamforming is determined by the coordination of the cells of the CoMP unit.

Sounding Reference Signal (SRS)

An SRS is used for enabling an eNodeB to measure channel quality so as to perform frequency-selective scheduling on the uplink and is not associated with uplink data and/or control information transmission. However, the present invention is not limited thereto and the SRS may be used for improved power control or supporting of various start-up functions of UEs which are not recently scheduled. Examples of the start-up functions may include, for example, initial Modulation and Coding Scheme (MCS), initial power control for data transmission, timing advance, and frequency-semi-selective scheduling (scheduling for selectively allocating frequency resources in a first slot of a subframe and pseudo-randomly hopping to another frequency in a second slot). Additionally, the SRS may be used for downlink channel quality measurement on the assumption that the radio channel is reciprocal between the uplink and downlink. This assumption is particularly valid in a Time Division Duplex (TDD) system in which the same frequency band is shared between the uplink and the downlink and is divided in the time domain.

The subframe through which the SRS is transmitted by a certain UE within the cell is indicated by cell-specific broadcast signaling. 4-bit cell-specific 'SrsSubframeConfiguration' parameter indicates 15 possible configurations of the subframe through which the SRS can be transmitted within each radio frame. By such configurations, it is possible to provide adjustment flexibility of SRS overhead according to a network arrangement scenario. The remaining one (sixteenth) configuration of the parameters indicates the switch-off of the SRS transmission within the cell and is suitable for a serving cell for serving high-rate UEs.

Figure 12:
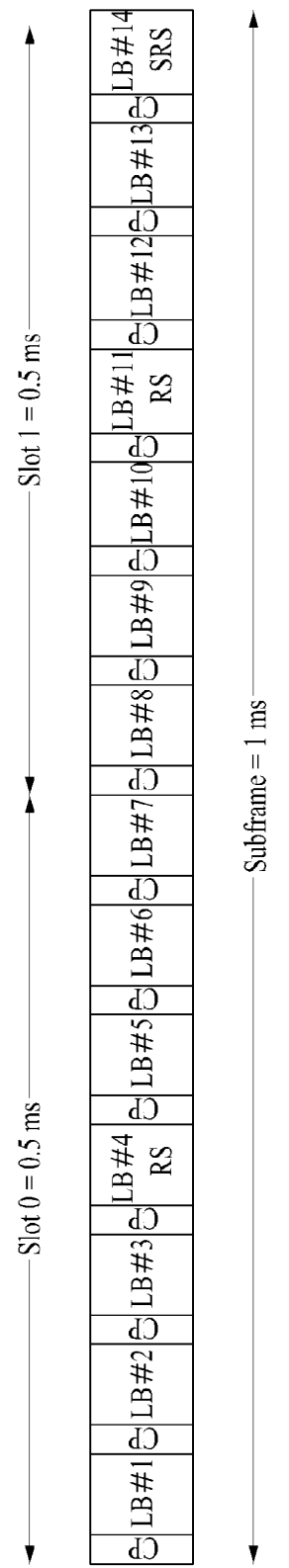
FIG. 12 illustrates a sounding reference signal.

As shown in FIG. 12, the SRS is always transmitted on a last SC-FDMA symbol of the configured subframe. Accordingly, the SRS and a Demodulation RS (DMRS) are located on different SC-FDMA symbols. PUSCH data transmission is not allowed on the SC-FDMA symbol specified for SRS transmission and thus sounding overhead does not approximately exceed 7% even when it is highest (i.e., even when SRS transmission symbols are present in all subframes).

Each SRS symbol is generated by the basic sequence (random sequence or Zadoff-Ch (ZC)-based sequence set) with respect to a given time unit and frequency band, and all UEs within the cell use the same basic sequence. At this time, the SRS transmission of the plurality of UEs within the cell in the same time unit and the same frequency band is orthogonally distinguished by different cyclic shifts of the base sequence allocated to the plurality of UEs. The SRS sequences of different cells can be distinguished by allocating different basic sequences to respective cells, but the orthogonality between the different basic sequences is not guaranteed.

Relay

A relay extends the service area of the base station or is installed in a shadow area (or shadow region) in order to facilitate service provision. The user equipment performs communication with the base station or the relay. The user equipment performing communication with the base station is referred to as a macro UE, and the user equipment performing communication with the relay is referred to as a relay UE. A communication link between the base station and the macro UE is referred to as a macro access link, and a communication link between the relay and the relay UE is referred to as a relay access link. Additionally, the communication link between the base station and the relay is referred to as a backhaul link.

Depending upon its performance level during a multi hop transmission, the relay may be divided into a L1 (layer 1) relay, a L2 (layer 2) relay, and a L3 (layer 3) relay. Additionally, depending upon its network link, the relay may be divided into an in-band connection, wherein a network-relay link and a network-UE link within a donor cell share the same frequency band, and an out-band connection, wherein each of the network-relay link and the network-UE link within a donor cell uses a different frequency band. Furthermore, the relay may also be divided into a transparent relay, wherein the user equipment is unaware of its performing communication through the relay, and a non-transparent relay, wherein the user equipment is aware of its performing communication through the relay. In light of the mobility of the relay, the relay may also be divided into a fixed relay, which corresponds to a relay that is used in order to enhance shadow areas or cell coverage, a nomadic relay, which corresponds to a relay that can be installed temporarily or randomly relocated when the number of users increases abruptly, and a mobile relay, which corresponds to a relay that can be mounted on a means of public transportation, such as buses or subway trains.

Figure 13:
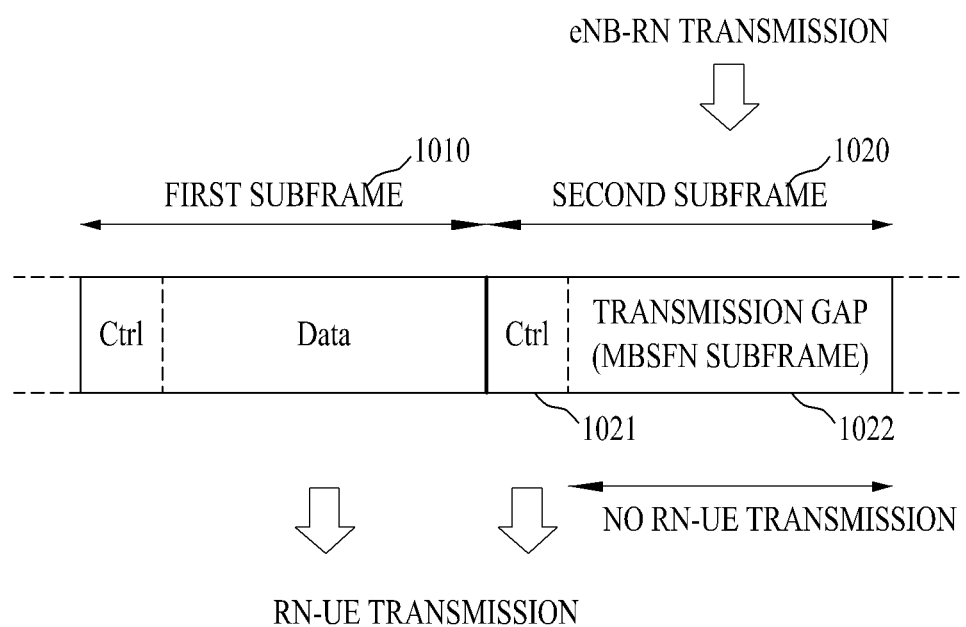
FIG. 13 illustrates resource allocation (or partitioning) for a relay.

FIG. 13 illustrates an example of performing backhaul transmission by using an MBSFN subframe. In an in-band relay mode, the BS-relay link (i.e., backhaul link) operates in the same frequency band as the relay-UE link (i.e., relay access link). In case the relay receives a signal from the base station and transmits a signal to the user equipment, or in the opposite case (or vice versa), since the transmitter and receiver of the relay may interfere with one another, the relay may be restricted from performing transmission and reception at the same time. In order to do so, the backhaul link and the relay access link are processed with partitioning by using a TDM method. In order to support measurement operations of a legacy LTE user equipment existing in the relay zone, the LTE-A sets up a backhaul link in an MBSFN subframe (a fake MBSFN method). In case an arbitrary subframe is signaled to the MBSFN subframe, since the user equipment received only the control region (or area) (ctrl) of the corresponding subframe, the relay may configure the backhaul link by using the data region (or area) of the corresponding subframe.

Carrier Aggregation

Figure 14:
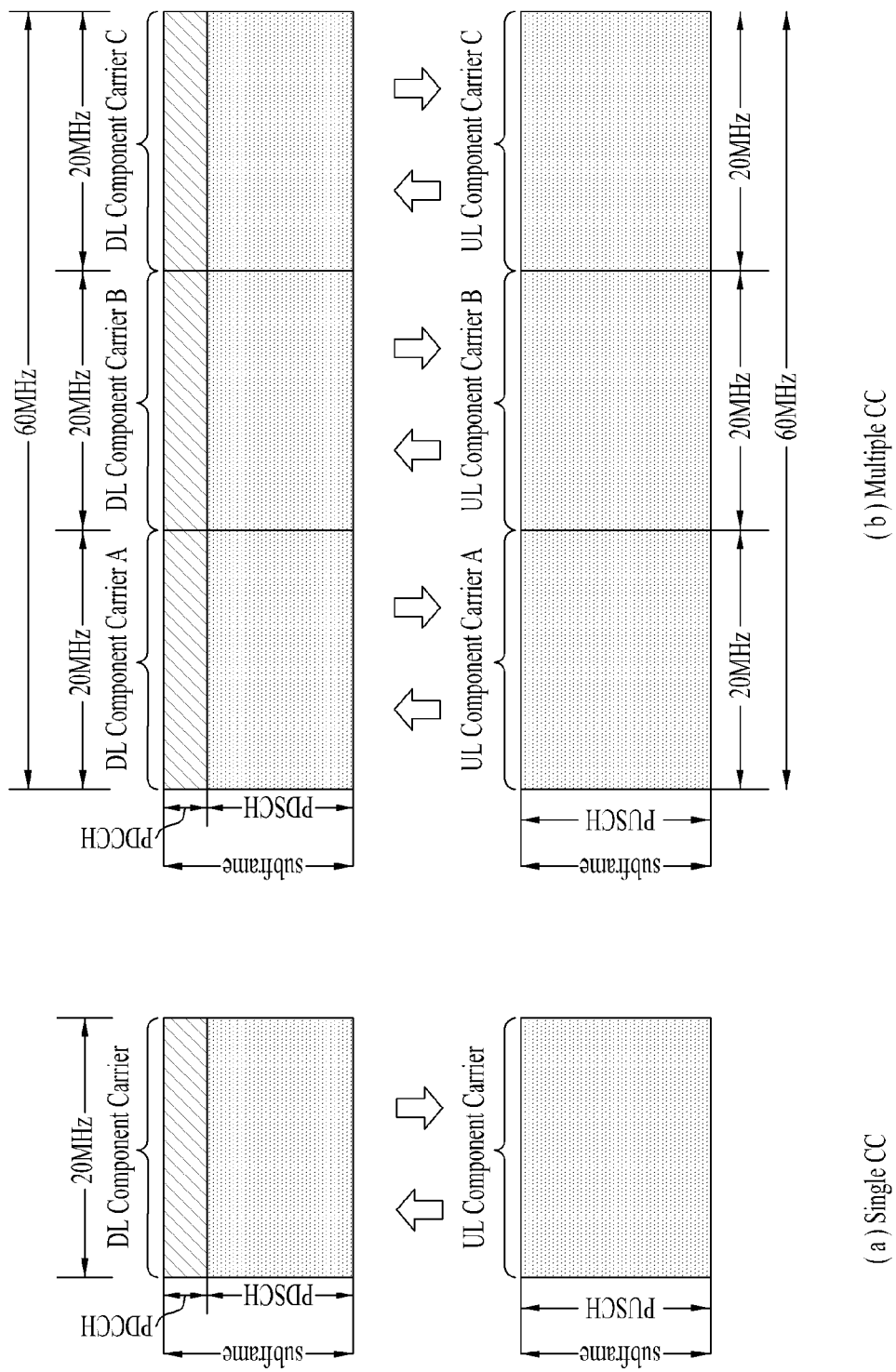
FIG. 14 illustrates carrier aggregation.

FIG. 14 illustrates carrier aggregation. Prior to describing carrier aggregation, the concept of a cell being adopted for managing radio resources in the LTE-A will hereinafter be described firsthand. A cell may be understood as a combination of a downlink resource and an uplink resource. Herein, the uplink resource does not correspond to an essential element, and, therefore, a cell may be configured only of a downlink resource or may be configured of both the downlink resource and the uplink resource. However, this is a definition established in the current LTE-A release 10. And, an opposite case may also be realized, i.e., a cell may be configured only of the uplink resource. The downlink resource may be referred to as a Downlink component carrier (DL CC), and the uplink resource may be referred to as an Uplink component carrier (UL CC). The DL CC and the UL CC may be expressed as carrier frequency, and the carrier frequency signifies a center frequency within the corresponding cell.

A cell may be divided into a primary cell (PCell), which operates in a primary frequency, and a secondary cell (SCell), which operates in a secondary frequency. The PCell and the SCell may be collectively referred to as a serving cell. In case of the PCell, a cell being designated when the user equipment performs an initial connection establishment procedure or during a connection re-establishment procedure or a handover procedure, may become the PCell. More specifically, the PCell may be understood as a cell that becomes a control-related center in carrier aggregation environment, which will be described in detail later on. The user equipment may be assigned (or allocated) with the PUCCH from its own PCell and may then transmit the allocated PUCCH. The SCell may be configured after RRC (Radio Resource Control) connection establishment, and the SCell may be used for providing additional radio resource. In the carrier aggregation environment, all serving cells excluding the PCell may be viewed as the SCell. In case of a user equipment that is in an RRC CONNECTED state, yet in case carrier aggregation is not set up or is case the user equipment does not support carrier aggregation, only a single serving cell consisting only of PCells exist. Conversely, in case of a user equipment that is in the RRC CONNECTED state and that is set up with carrier aggregation, at least one or more serving cells exist, and PCells and all SCells are included in all serving cells. For a user equipment supporting carrier aggregation, after an initial security activation procedure is initiated, the network may configure at least one or more SCells in additional to the PCell, which is configured at the beginning of the connection establishment procedure.

Hereinafter, carrier aggregation will be described with reference to FIG. 14. Carrier aggregation corresponds to a technology that has been adopted to allow the usage of a broader (or wider) band in order to meet with the requirements of a high-speed transmission rate. Carrier aggregation may be defined as an aggregation of at least 2 or more component carriers (CCs), each having a different frequency. Referring to FIG. 14, FIG. 14(a) illustrates a subframe in a case when one CC is used in the conventional LTE system, and FIG. 14(b) illustrates a subframe in a case when carrier aggregation is being used. For example, it is illustrates in FIG. 14(b) that 3 CCs of 20 MHz are used, thereby supporting a bandwidth of a total of 60 MHz. Herein, each CC may be continuous or may be non-continuous (or discontinuous).

The user equipment may simultaneously receive and monitor downlink data from a plurality of DL CCs. A linkage between each DL CC and UL CC may be designated by the system information. The DL CC/UL CC link may be fixed to the system or may be semi-statically configured. Additionally, even if the entire system band is configured of N number of CCs, the frequency band through which a specific user equipment may perform monitoring/reception may be limited M(<N) number of CCs. Diverse parameters respective to carrier aggregation may be set up by a cell-specific method, a UE group-specific or UE-specific method.

Figure 15:
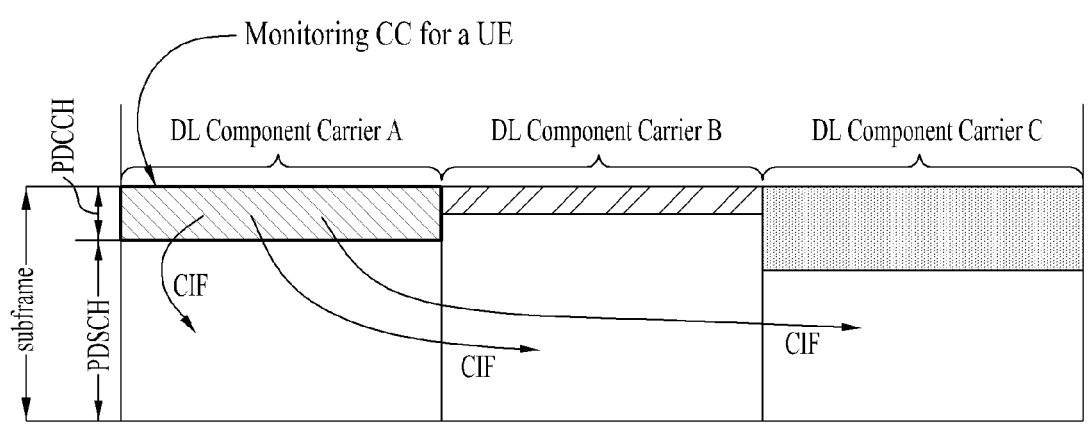
FIG. 15 illustrates cross-carrier scheduling.

FIG. 15 illustrates cross-carrier scheduling. Cross-carrier scheduling, for example, refers to all downlink scheduling allocation information of another DL CC being included in the control region of any one DL CC, among multiple serving cells, or all uplink scheduling authorization (or certification) information respective to multiple UL CCs linked to any one DL CC being included in the control region of the one DL CC, among multiple serving cells.

First of all, a carrier indicator field (CIF) will be described in detail. As described above, the CIF may either be included or not included in the DCI format, which is being transmitted through the PDCCH. And, in case the CIF is included in the DCI format, this indicates that cross-carrier scheduling is applied. In case cross-carrier scheduling is not applied, the downlink scheduling allocation information is valid within the DL CC through which current downlink scheduling allocation information is being transmitted. Additionally, the uplink scheduling authorization is valid for a UL CC, which is linked to the DL CC through which the downlink scheduling allocation information is being transmitted.

In case cross-carrier scheduling is being applied, the CIF indicates a CC related to the downlink scheduling allocation information, which is transmitted through the PDCCH from any one DL CC. For example, referring to FIG. 15, downlink allocation information, i.e., information on PDSCH resource, respective to DL CC B and DL CC C is transmitted through the PDCCH within the control region of DL CC A. The user equipment may monitor DL CC A, so as to figure out the resource area of the PDSCH and the corresponding CC through the CIF.

Whether the CIF is included or not included in the PDCCH may be semi-statically set up, and the CIF may be UE-specifically activated (or enabled) by higher-layer signaling. In case the CIF is disabled, the PDCCH of a specific DL CC allocates PDSCH resource of the same DL CC and may also allocate PUSCH resource of a UL CC, which is linked to the specific DL CC. In this case, the same coding method, CCE based resource mapping, DCI format, and so on, as the conventional PDCCH structure may be applied.

Meanwhile, in case the CIF is enabled, the PDCCH of a specific DL CC may allocate PDSCH/PUSCH resource within a single DL/UL CC being indicated by the CIF, among the multiple aggregated CCs. In this case, a CIF may be additionally defined in the conventional PDCCH DCI format, and the CIF may be defined as a field having a fixed length of 3 bits, or the CIF position may be fixed regardless of the DCI format size. In this case also, the same coding method, CCE based resource mapping, DCI format, and so on, as the conventional PDCCH structure may be applied.

In case the CIF exists, the base station may allocation a DL CC set, which is intended to monitor the PDCCH. Accordingly, the burden of blind decoding of the UE may be decreased. The PDCCH monitoring CC set corresponds to a portion of the entire aggregated DL CC, and the user equipment may perform PDCCH detection/decoding only in the corresponding CC set. More specifically, in order to perform PDSCH/PUSCH scheduling with respect to the user equipment, the base station may transmit the PDCCH only over the PDCCH monitoring CC set. The PDCCH monitoring CC set may be UE-specifically or UE group-specifically or cell-specifically set up. For example, as shown in the example of FIG. 15, when 3 DL CCs are aggregated, DL CC A may be set up as the PDCCH monitoring DL CC. In case the CIF is disabled, the PDCCH of each DL CC may schedule only the PDSCH within the DL CC A. Meanwhile, when the CIF is enabled, in addition to the DL CC A, the PDCCH of DL CC A may also schedule the PDSCH of other DL CCs. In case the DL CC A is set up as the PDCCH monitoring CC, the PDSCCH is not transmitted to DL CC B and the DL CC C.

In a system having the above-described carrier aggregation applied thereto, the user equipment may receive multiple PDSCH through multiple downlink carriers. And, in this case, there may occur a case when the user equipment is required to transmit ACK/NACK respective to each data set from one UL CC within a single subframe. When multiple ACK/NACKs are being transmitted from a single subframe by using PUCCH format 1a/1b, a high transmission power is required, PAPR of an uplink transmission is increased, and, due to an inefficient usage of a transmission power amplifier, the available transmission distance of the user equipment from the base station may be decreased. In order to transmit multiple ACK/NACKs through a single PUCCH, ACK/NACK bundling or ACK/NACK multiplexing may be applied.

Additionally, there may occur a case when ACK/NACK information respective to a large number of downlink data sets according to the application of carrier aggregation and/or ACK/NACK information respective to a large number of downlink data sets being transmitted from a plurality of DL subframes in a TDD system is required to be transmitted through the PUCCH in a single subframe. In such case, if the number if ACK/NACK bits that are to be transmitted is larger than the number of bits available for support through ACK/NACK bundling or multiplexing, the ACK/NACK information may not be correctly transmitted by using the above-described methods.

ACK/NACK Multiplexing Methods

In case of performing ACK/NACK multiplexing, contents of an ACK/NACK response respective to multiple data units may be identified by a combination of an ACK/NACK unit that is actually used in an ACK/NACK transmission and one of multiple QPSK modulated symbols. For example, it will be assumed that one ACK/NACK unit carries information having the size of 2 bits, and that the ACK/NACK unit receives a maximum of 2 data units. Herein, it will be assumed that the HARQ ACK/NACK response respective to each of the received data unit is expressed by using one ACK/NACK bit. In such case, a transmitting end transmitting the data may identify the ACK/NACK result as shown below in Table 5.

TABLE 5

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 5, HARQ-ACK(i) (i=0, 1) indicates an ACK/NACK result respective to data unit i. As described above, since it is assumed that a maximum of 2 data units (data unit 0 and data unit 1) are received, in table 5, the ACK/NACK result respective to data unit 0 is expressed as HARQ-ACK (0), and the ACK/NACK result respective to data unit 1 is expressed as HARQ-ACK(1). In Table 5 shown above, DTX (Discontinuous Transmission) indicates that a data unit respective to HARQ-ACK(i) is not being transmitted or that a receiving end is incapable of detecting the presence (or existence) of a data unit respective to HARQ-ACK(i). Additionally, $n_{PUCCH,X}^{(1)}$ represents an ACK/NACK unit that is actually used in the ACK/NACK transmission. In case a maximum of 2 ACK/NACK units exist, the corresponding ACK/NACK units may be expressed as $n_{PUCCH,0}^{(1)}$ and $n_{PUCCH,1}^{(1)}$. Additionally, b(0), b(1) represents the 2 bits being transmitted by the selected ANK/NACK unit. A modulation symbol being transmitted through the ACK/NACK unit is decided in accordance with the b(0), b(1) bit.

For example, in case the receiving end has successfully received and decoded 2 data units (i.e., in case of ACK, ACK in Table 5), the receiving end transmits 2 bits (1, 1) by using $n_{PUCCH,1}^{(1)}$. Alternatively, in case the receiving end receives 2 data units, when decoding (or detection) of the first data unit (i.e., data unit 0 respective to HARQ-ACK(0)) has failed, and when decoding of the second data unit (i.e., data unit 1 respective to HARQ-ACK(1)) has been successfully performed (i.e., in case of NACK/DTX, ACK in Table 5), the receiving end transmits 2 bits (0, 0) by using $n_{PUCCH,1}^{(1)}$.

As described above, by linking or mapping an ACK/NACK unit selection and a combination of actual bit contents of a transmitted ACK/NACK bit (i.e., a combination of any one of $n_{PUCCH,0}^{(1)}$ and $n_{PUCCH,1}^{(1)}$ and b(0), b(1) in Table 5) to the contents of an actual ACK/NACK, ACK/NACK information respective to multiple data units may be transmitted by using a single ACK/NACK unit. By extending the principles of the above-described ACK/NACK multiplexing, ACK/NACK multiplexing respective to more than 2 data units may be easily realized.

In such ACK/NACK multiplexing method, when at least one ACK basically exists with respect to each of the data units, NACK and DTX may not be identified (or differentiated) from one another (i.e., as expressed one as NACK/DTX in Table 5, NACK and DTX may be coupled). This is because the ACK/NACK states (i.e., ACK/NACK hypotheses), which may occur when NACK and DTX are to be differently expressed, cannot all be reflected by using only a combination of an ACK/NACK unit and a QPSK-modulated symbol. Meanwhile, when an ACK does not exist with respect to all data units (i.e., when only NACK or DTX exist with respect to all data units), a case of having one certain NACK indicating that only one of the multiple HARQ-ACK(i)s is certainly a NACK (i.e., a NACK being differentiated from a DTX) may be defined. In this case, an ACK/NACK unit respective to a data unit corresponding to the one certain NACK may be reserved for transmitting signals of multiple ACK/NACKs.

Semi-Persistent Scheduling (SPS)

DL/UL SPS (semi-persistent scheduling) first designates to the UE from which subframes the SPS is to be transmitted/received (based upon subframe cycle and offset) via RRC (Radio Resource Control) signaling, and then the actual activation and release of the SPS is performed through the PDCCH. More specifically, even if the UE is allocated with the SPS via RRC signaling, instead of immediately performing SPS TX/RX, when a PDCCH notifying the activation (or reactivation) is received (i.e., when a PDCCH having an SPS C-RNTI detected therefrom is received), the SPS operation may be performed accordingly. More specifically, when an SPS activation PDCCH is received, a frequency resource is allocated in accordance with RB allocation designated by the received PDCCH, and modulation and coding rate respective to MCS information are applied, so that the TX/RX can be initiated by using the subframe cycle and offset, which are allocated via RRC signaling. Meanwhile, when a PDCCH notifying SPS release is received, the user equipment (UE) stops performing TX/RX. After the SPS TX/RX is stopped, once a PDCCH notifying the activation (or reactivation) is received, the TX/RX may be continued by using the subframe cycle and offset, which are allocated via RRC signaling, in accordance with the RB allocation, MCS, and so on, which are designated by the received PDCCH.

In the PDCCH format, which is currently defined in the 3GPP LTE, diverse formats are defined, such as DCI format 0, which is specified for uplink, and DCI formats 1, 1A, 1B, 1C, 1D, 2, 2A, 3, 3A, and so on, which are specified for downlink, and control information, such as Hopping flag, RB allocation, MCS (modulation coding scheme), RV (redundancy version), NDI (new data indicator), TPC (transmit power control), Cyclic shift DMRS (demodulation reference signal), UL index, CQI (channel quality information) request, DL assignment index, HARQ process number, TPMI (transmitted precoding matrix indicator), PMI (precoding matrix indicator) confirmation, are transmitted in the form of selected combination.

More specifically, a case of using the PDCCH for the purpose of SPS scheduling activation/release may be validated by having the CRC of the DCI being transmitted through the PDCCH masked with an SPS C-RNTI, and by setting NDI to 0 (NDI=0). At this point, the SPS activation may be used as a virtual CRC by setting a combination of the bit field to 0, as shown below in Table 6.

TABLE 6

|  | DCI format 0 | DCI format 1/1A | DCI format 2/2A/2B |
|---|---|---|---|
| TPC command for scheduled PUSCH | set to '00' | N/A | N/A |
| Cyclic shift DMRS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

When an error that cannot even be verified by the CRC occurs, by verifying whether or not the corresponding bit field value corresponds to a prearranged value, the virtual CRC provides additional error detection capability. When a error occurs in a DCI, which is assigned (or allocated) to another UE, yet when the specific UE is incapable of detecting the corresponding error and misinterprets (or misrecognizes) the corresponding error as its own SPS activation, since the corresponding resource is continuously used, one error may cause a permanent problem. Therefore, by using a virtual CRC, incorrect detection of SPS may be prevented.

TABLE 7

|  | DCI format 0 | DCI format 1A |
|---|---|---|
| TPC command for scheduled PUSCH | set to '00' | N/A |
| Cyclic shift DMRS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

PUCCH Piggyback

In case of an uplink transmission in a conventional 3GPP LTE system (e.g., Release-8) system, in order to efficiently use a power AMP of the user equipment, a single carrier transmission having excellent PAPR (Peak-to-Average Power Ratio) characteristics or CM (Cubic Metric) characteristics, which influences the performance of the power amp, is maintained. More specifically, in case of a PUSCH transmission of the conventional LTE system, a single carrier characteristic is maintained by performing DTF-precoding on the data that are to be transmitted, and, in case of the PUCCH transmission, by loading information on a sequence having the single carrier characteristic and by transmitting the corresponding sequence, the single carrier characteristic may be maintained. However, when the DFT-precoded data are discontinuously allocated along the frequency axis, or when the PUSCH and the PUCCH are simultaneously transmitted, such single carrier characteristic may be broken.

Figure 16:
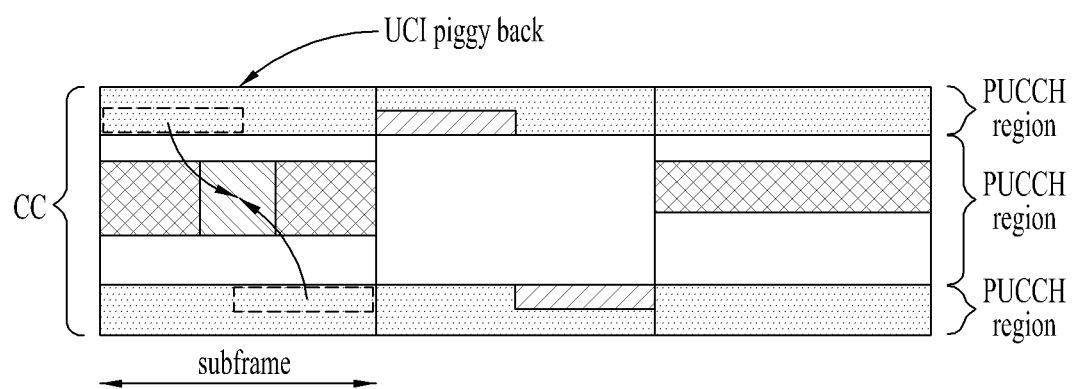
FIG. 16 illustrates a method of transmitting uplink control information through a PUSCH.

Therefore, as shown in FIG. 16, when a PUSCH transmission occurs in the same subframe as the PUCCH transmission, UCI (uplink control information) information that is to be transmitted through the PUCCH is intended to be piggy-backed along with the data through the PUSCH in order to maintain the single carrier characteristic.

As described above, since the conventional LTE terminal (or user equipment) cannot transmit the PUCCH and the PUSCH at the same time, the user equipment uses a method of multiplexing the UCI (CQI/PMI, HARQ-ACK, RI, and so on) to the PUSCH region in a subframe to which the PUSCH is transmitted. For example, when CQI and/or PMI is to be transmitted from a subframe, which is assigned to transmit the PUSCH, UL-SCH data and CQI/PMI are multiplexed before performing DFT-dispersion, and, then, the control information is transmitted along with data. In this case, the UL-SCH data perform rate-matching based upon the CQI/PMI resource. Additionally, the control information, such as HARQ, ACK, RI, and so on, may be multiplexed to the PUSCH region by puncturing the UL-SCH data.

Figure 17:
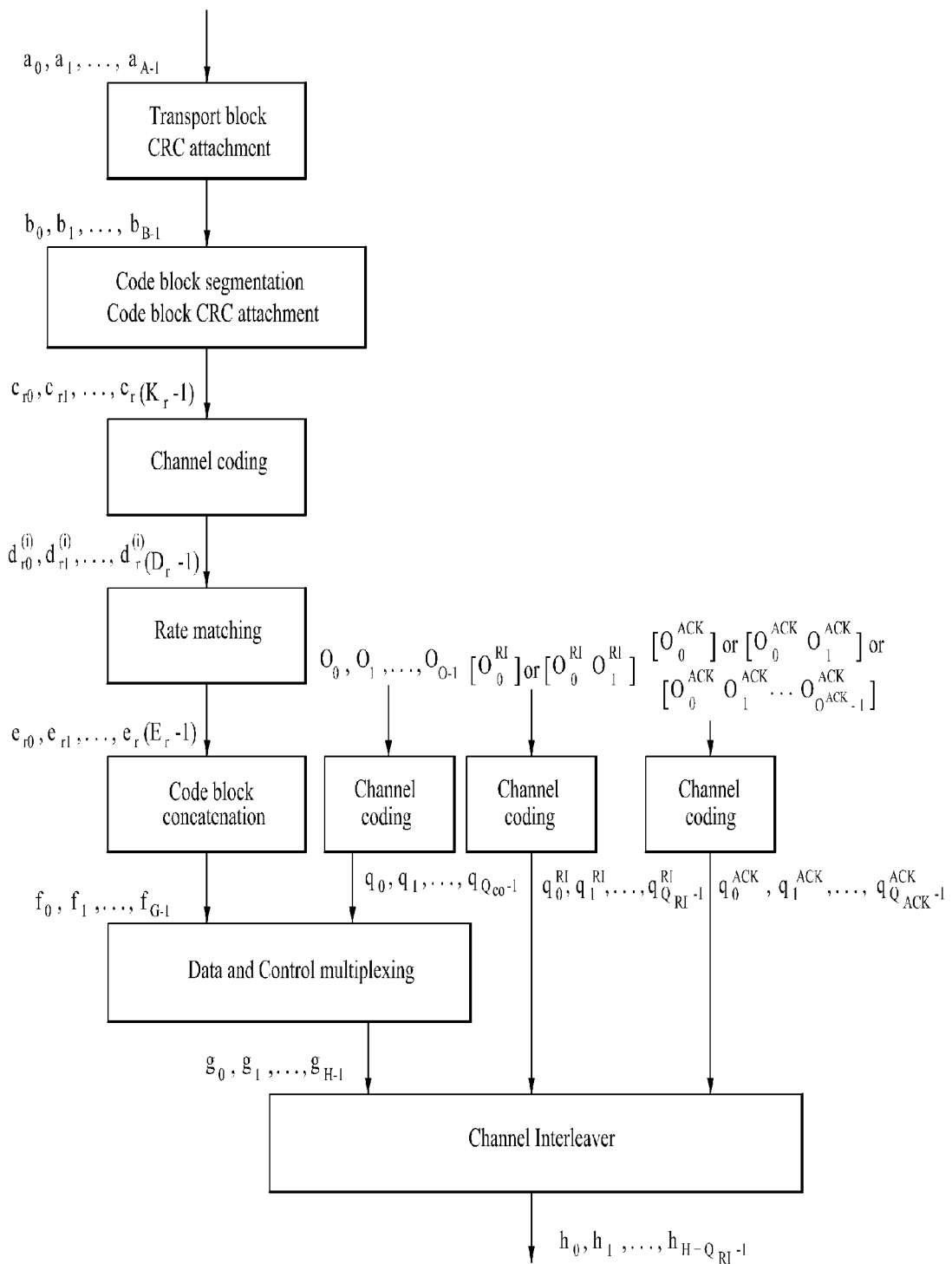
FIG. 17 illustrates an exemplary multiplexing process of uplink data and control information.

FIG. 17 illustrates an exemplary process of multiplexing uplink data and control information for an uplink transmission.

As shown in FIG. 17, the data information that are being multiplexed with the control information is configured by adding a TB-specific CRC (Cyclic Redundancy Check) to a transport block (hereinafter referred to as "TB") (a0, a1, . . . , aA-1), which is to be transmitted via uplink, then by dividing the processed transport block to multiple code blocks (hereinafter referred to as "CB") in accordance with the TB size, and by adding CB-specific CRC to the multiple CBs. Thereafter, channel coding is performed on the resulting values. Subsequently, the channel-coded data are processed with rate matching, and then combination of the CBs is performed. Subsequently, such combined CBs are then multiplexed with the control signal.

Meanwhile, a channel coding process other than that of the data is performed on the CQI/PMI (o0, o1, . . . , oo-1). Then, the channel-coded CQI/PMI is multiplexed to the data. Thereafter, the data multiplexed with the CQI/PMI are inputted to a channel interleaver.

Additionally, a channel coding process other than that of the data is also performed on Rank information ([o0RI] or [o0RI o1RI]) (S511). The channel-coded rank information may be inserted in a portion of the interleaved signal through processing, such as puncturing.

A channel coding process other than that of the data, CQI/PMI, and rank information is performed on the ACK/NACK information ([o0ACK] or [o0 ACK o1ACK] . . . ). The channel-coded ACK/NACK information may also be inserted in a portion of the interleaved signal through processing, such as puncturing.

Hereinafter, based upon the description provided above, a method of performing aggregation on different frequency spectrums, frequency bands or carriers and using the aggregated result will be described in detail.

Figure 18:
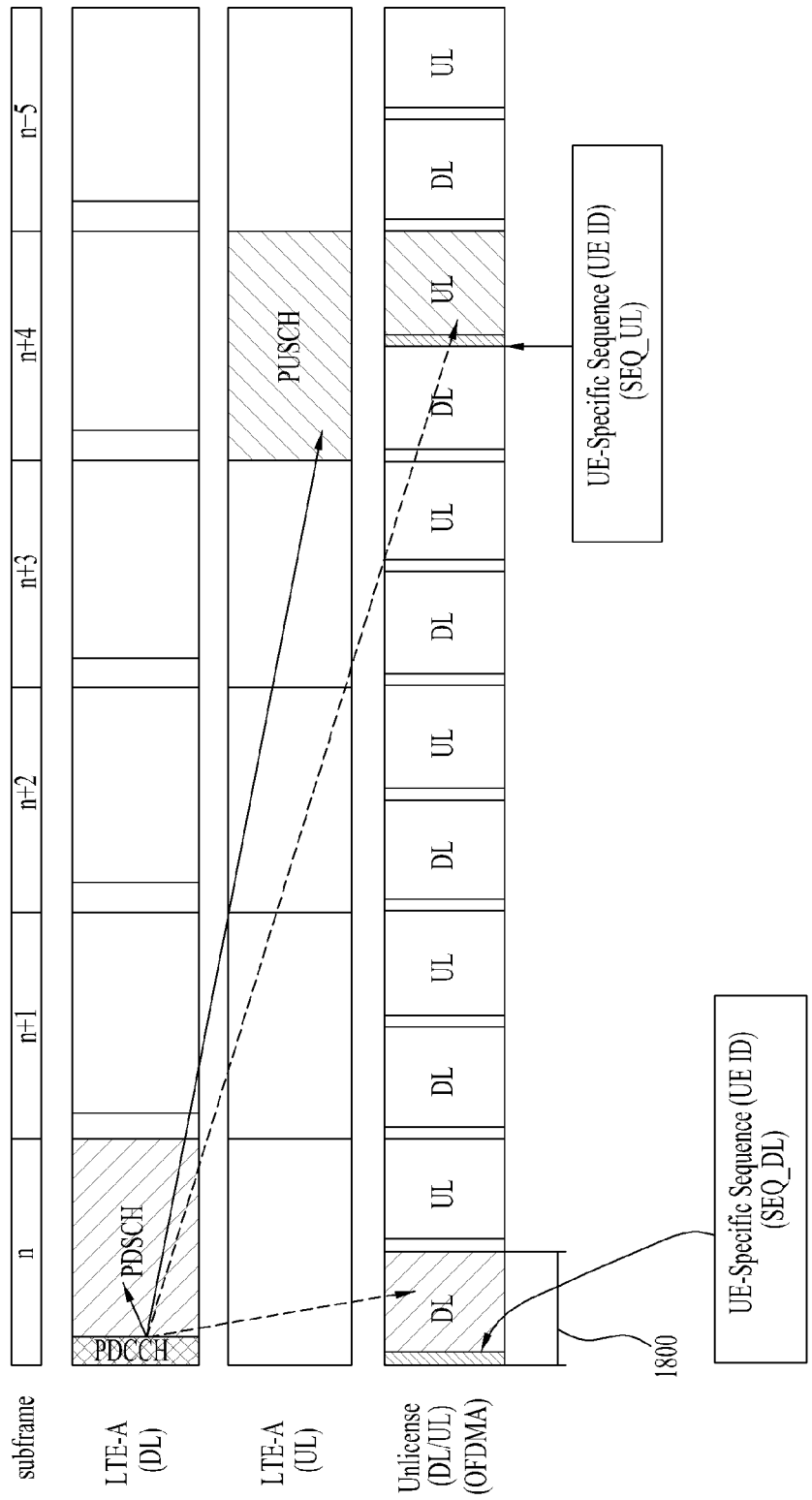
FIG. 18 illustrates a method of transmitting information over an OFDMA type unlicensed band according to an exemplary embodiment of the present invention.

The following description will be provided based upon, for example, a system using two cells, as shown in FIG. 18, for simplicity. It will be provided herein that one cell (e.g., Pcell) corresponds to a frequency band cell being dedicated to the LTE-LTE-A, and that the other cell corresponds to an unlicensed band. However, this example is merely given to facilitate the described of the present invention, and, therefore, the presence of a larger number of Scells (LTE/LTE-A frequency band and/or unlicensed band) within the serving cell will not be excluded.

FIG. 18 illustrates a method of transmitting information over an OFDMA type unlicensed band according to an exemplary embodiment of the present invention.

Referring to FIG. 18, it will be apparent that a time unit (hereinafter referred to as an access slot (1800)), which is divided within a configuration carrier of the unlicensed band, is time aligned with a subframe (hereinafter referred to as a LTE/LTE-A subframe) of a frequency band being dedicated for the usage of the LTE/LTE-A. As described above, when the access slot is time aligned with the LTE/LTE-A subframe, since the base station can simultaneously schedule the LTE/LTE-A subframe and the access slot of the unlicensed band, this is advantageous for management. However, the following description of the present invention will not exclude a case when the access slot and the LTE/LTE-A subframe are not time aligned. Herein, in the time domain of the unlicensed band, the access slot may include a time section (or time interval) to which the sequence that is to be described later on is being transmitted and its subsequent resource area.

Also, as shown in the drawing, two access slots are allocated for each LTE/LTE-A subframe. However, the time length of such access slot is merely exemplary, and N (wherein N is an integer) number of access slots is allocated per time length of the LTE/LTE-A subframe.

Additionally, as shown in FIG. 18, settings may be made so that the downlink transmission specific access slot and the uplink transmission specific access slot are alternately aligned. And, the base station and the user equipment may share such information through RRC signaling, and so on.

The base station may schedule a resource area of a downlink access slot of an unlicensed band within a Pcell of the LTE/LTE-A band. More specifically, the unlicensed band is used as a serving cell, Scell, and it will be apparent that cross-carrier scheduling is applied. Additionally, the base station may transmit scheduling information of the unlicensed band over the PDCCH of the Pcell while transmitting a specific sequence to a starting portion (or beginning) (e.g., 1 OFDM symbol time length, and so on) of an access slot in the unlicensed band. This sequence may identify which user equipment is designated to the current access slot, and this sequence may include UE identification. More specifically, the sequence may correspond to a sequence having a UE identifier processed with CRC (Cyclic Redundancy Check) masking or a sequence being scrambled with a UE identifier. Alternatively, the sequence may be generated by using the UE identifier as seed. Herein, it will be provided that a downlink access slot of the unlicensed band can be used by the base station via carrier sensing respective to the unlicensed band.

When the user equipment receives a sequence including a user equipment identifier within the unlicensed band at a timing point of an $n^{th}$ LTE-A subframe, the user equipment may be capable of determining whether the access slot belongs to the user equipment itself. Additionally, as described above, since the access slot is pre-decided as a downlink transmission specific access slot or an uplink transmission specific access slot, it may be known that this access slot corresponds to a downlink transmission specific access slot. Therefore, the user equipment may use the downlink control information (e.g., MCS (modulation and coding scheme), resource block assignment, and so on), which is included in the PDCCH being received by the Pcell, so as to successfully decode the information, which is received in the access slot of the unlicensed band.

Meanwhile, the base station may schedule a resource area of an uplink access slot within the unlicensed band. For example, in the unlicensed band, the base station may schedule a resource area of an uplink access slot for an ACK/NACK transmission respective to the downlink transmission along with the downlink access slot scheduling. As described in the case of the downlink access slot, when a transmission timing of the scheduled uplink access slot is reached, the base station may transmit a sequence including a user equipment identifier to a starting portion of the access slot.

However, due to the usage regulations of the unlicensed band, when the base station fails to reserve any uplink access slot, the base station is required to perform carrier sensing prior to transmitting the ACK/NACK to the uplink access slot. Based upon the carrier sensing result, if a scheduled uplink access slot fails to be used at the appropriate timing, the ACK/NACK transmission may fail. In order to prevent such failure from occurring, unlike the example shown in FIG. 18, the uplink access slot for the ACK/NACK transmission respective to the data being transmitted through the downlink access slot may be scheduled as another downlink access slot (e.g., an uplink access slot corresponding to a time section of an $n+2^{th}$ LTE-A subframe), or a resource area of a surplus uplink access slot for the ACK/NACK transmission may be scheduled.

Although the description provided above is based upon a base station performing scheduling on an unlicensed band with respect to a user equipment, multiple user equipments may be multiplexed with respect to the access slot. In this case, the sequence may be configured to include identifiers of the multiplexed plurality of user equipments.

Figure 19:
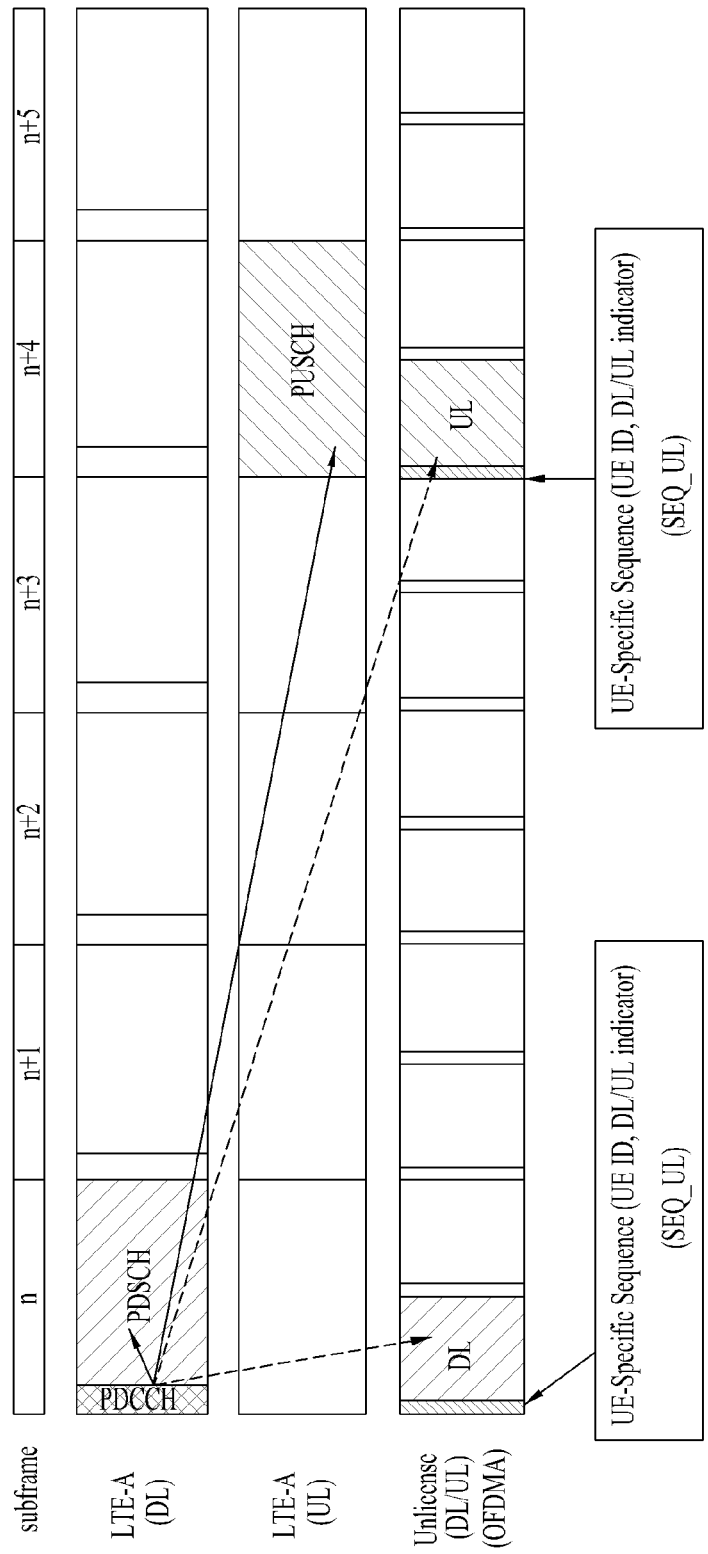
FIG. 19 illustrates a method of transmitting information over an OFDMA type unlicensed band according to another exemplary embodiment of the present invention.

FIG. 19 illustrates a method of transmitting information over an OFDMA type unlicensed band according to another exemplary embodiment of the present invention.

Referring to FIG. 19, unlike in the example shown in FIG. 18, the unlicensed band is not pre-set to the downlink access slot and the uplink access slot. Therefore, an indicator for notifying whether the current access slot corresponds to a downlink transmission specific access slot or an uplink transmission specific access slot may be included in the above-described sequence. Alternatively, instead of a separate indicator notifying whether the current access slot corresponds to a downlink transmission specific access slot or an uplink transmission specific access slot, such information may be implicitly notified by the sequence itself. More specifically, the sequence being transmitted by the base station may be selected from one of the sequences corresponding to a downlink transmission specific sequence group and an uplink transmission specific sequence group. More specifically, when transmitting a sequence respective to a downlink access slot, which is scheduled by the base station, the sequence may be selected from the downlink transmission specific sequence group. After receiving the corresponding sequence, by determining to which sequence group the corresponding sequence belongs, the user equipment may determine that the current access slot corresponds to a downlink access slot.

Meanwhile, a separate guard period or a special subframe may be required as a countermeasure for any propagation delay that may occur with respect to an increase in the cell radius. In case of the guard period, the guard period may be inserted in an area allocated to the access slot for the above-described sequence transmission.

Figure 20:
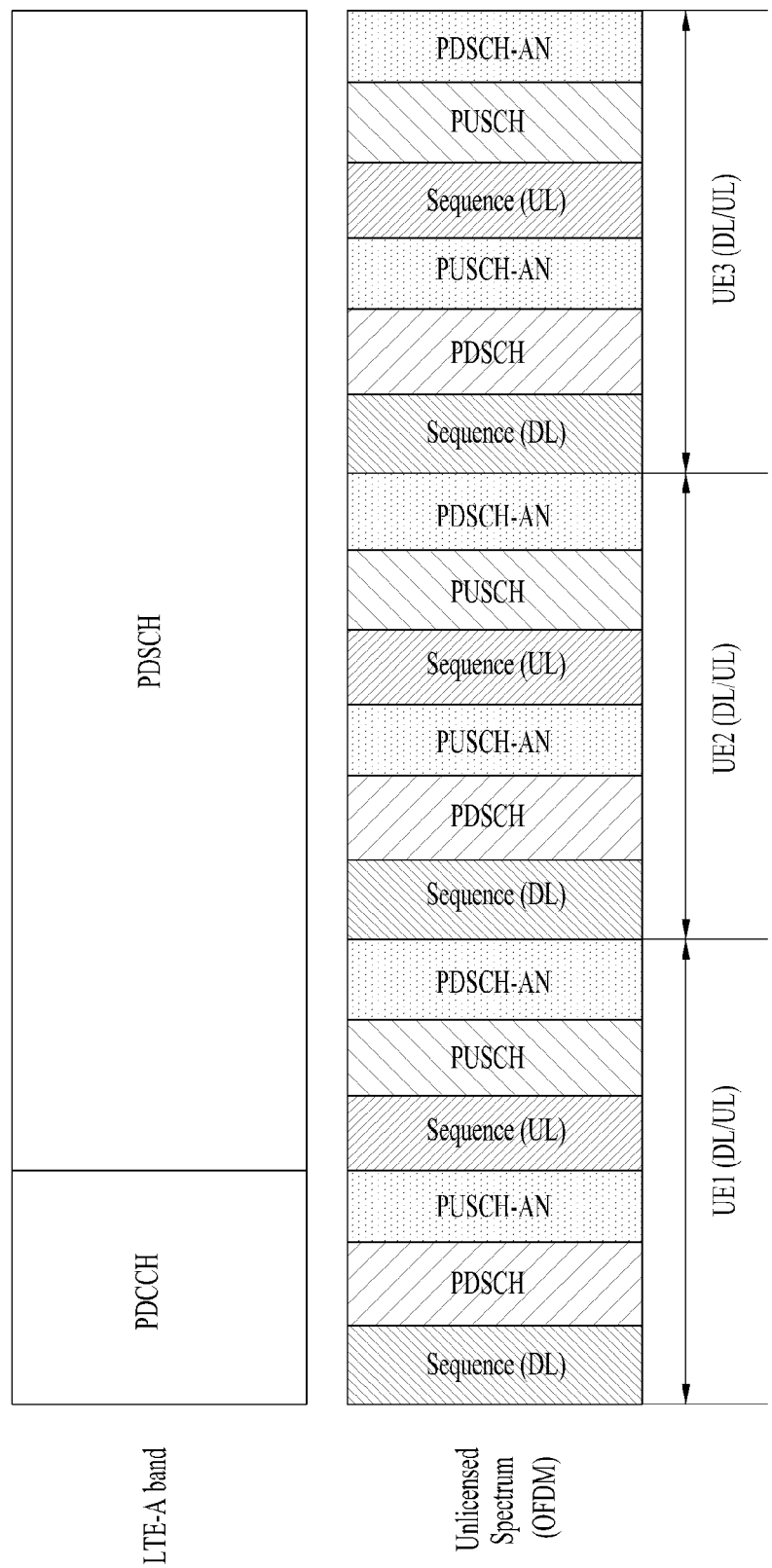
FIG. 20 illustrates a method of transmitting information over an OFDM type unlicensed band according to an exemplary embodiment of the present invention.

FIG. 20 illustrates a method of transmitting information over an OFDM type unlicensed band according to an exemplary embodiment of the present invention. More specifically, in FIG. 20, one user equipment uniquely (or solely) uses the frequency band of an unlicensed band, and this may be more advantageously applied in case the frequency bandwidth of the unlicensed band is narrow. Since the OFDM method is used, when multiple user equipments are required to be supported, TDM may be applied herein.

Referring to FIG. 20, 6 access slots are illustrates for one LTE-A subframe time length. At the starting portion (or beginning) of each access slot, as described above, a user equipment identifier and/or a sequence including an indicator notifying whether the current access slot corresponds to a downlink transmission specific access slot or an uplink transmission specific access slot. As shown in FIG. 20, two access slots are designated for one user equipment (UE1), and, therefore, a total of 3 user equipments may be supported. Additionally, one access slot may have an area allocated for transmitting an ACK/NACK respective to the PUSCH (PUSCH-AN) or an area allocated for transmitting an ACK/NACK respective to the PDSCH (PDSCH-AN).

Herein, the number of access slots being included in the LTE-A subframe time length may be decided in accordance with the number of user equipment being multiplexed by using the TDM method. More specifically, unlike in the example shown in FIG. 20, when the maximum number of user equipments available for multiplexing is equal to n, 2n number of access slots may be included in one LTE-A subframe time length.

Figure 21:
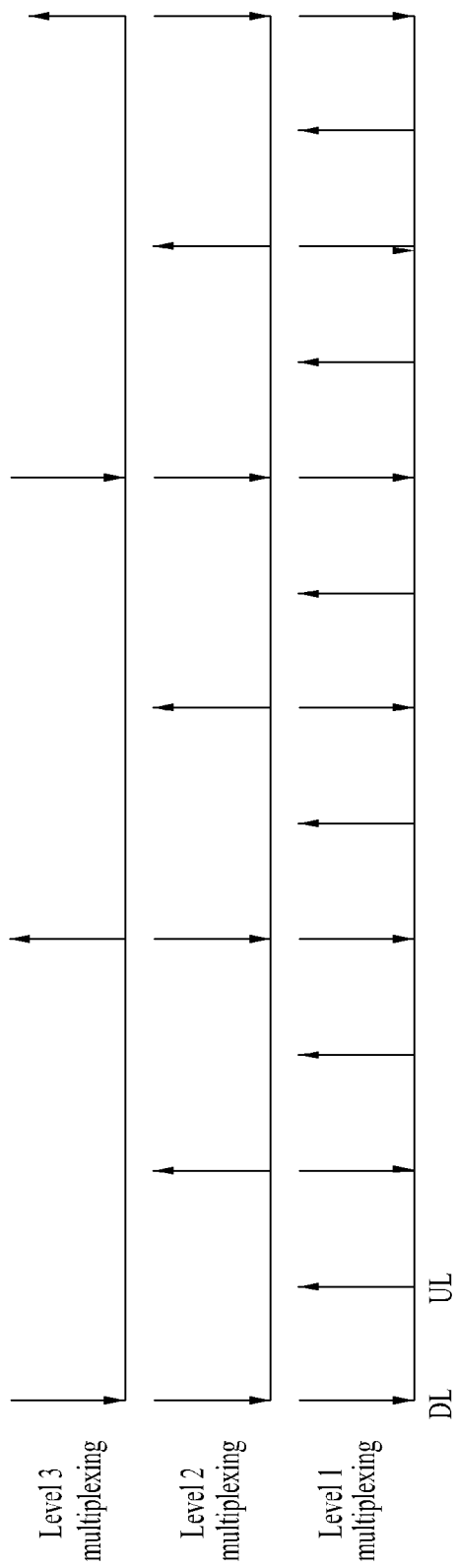
FIG. 21 illustrates a change in a number of user equipments being multiplexed and a number of access slots according to an exemplary embodiment of the present invention.

FIG. 21 illustrates such change in the number of access slots in accordance with the number of user equipments being multiplexed. Referring to FIG. 21, the arrow pointing downward indicates the starting point of a downlink access slot, and the arrow pointing upward indicates the starting point of an uplink access slot, and the transmission of the above-described sequence is initiated at this time point. Level 1 multiplexing may correspond to the access slot configuration shown in FIG. 20, and, in Level 2 multiplexing, the number of multiplexed user equipments becomes half of the number of user equipments multiplexed in Level 1 multiplexing, and the number of access slots is also reduced to half of the number of access slots included in Level I multiplexing. Herein, even if the number of access slots varies in accordance with the number of multiplexed user equipments, the starting point of each access link, at which the sequence begins to be transmitted, is aligned to best fit Level 1 multiplexing.

Meanwhile, as shown in FIG. 20, cross-carrier scheduling may not be applied in the PDCCH of the Pcell. Therefore, the scheduling information which was transmitted to the PDCCH, as shown in FIG. 18 to FIG. 19, may be required to be transmitted to a predetermined area within the access slot.

Figure 22:
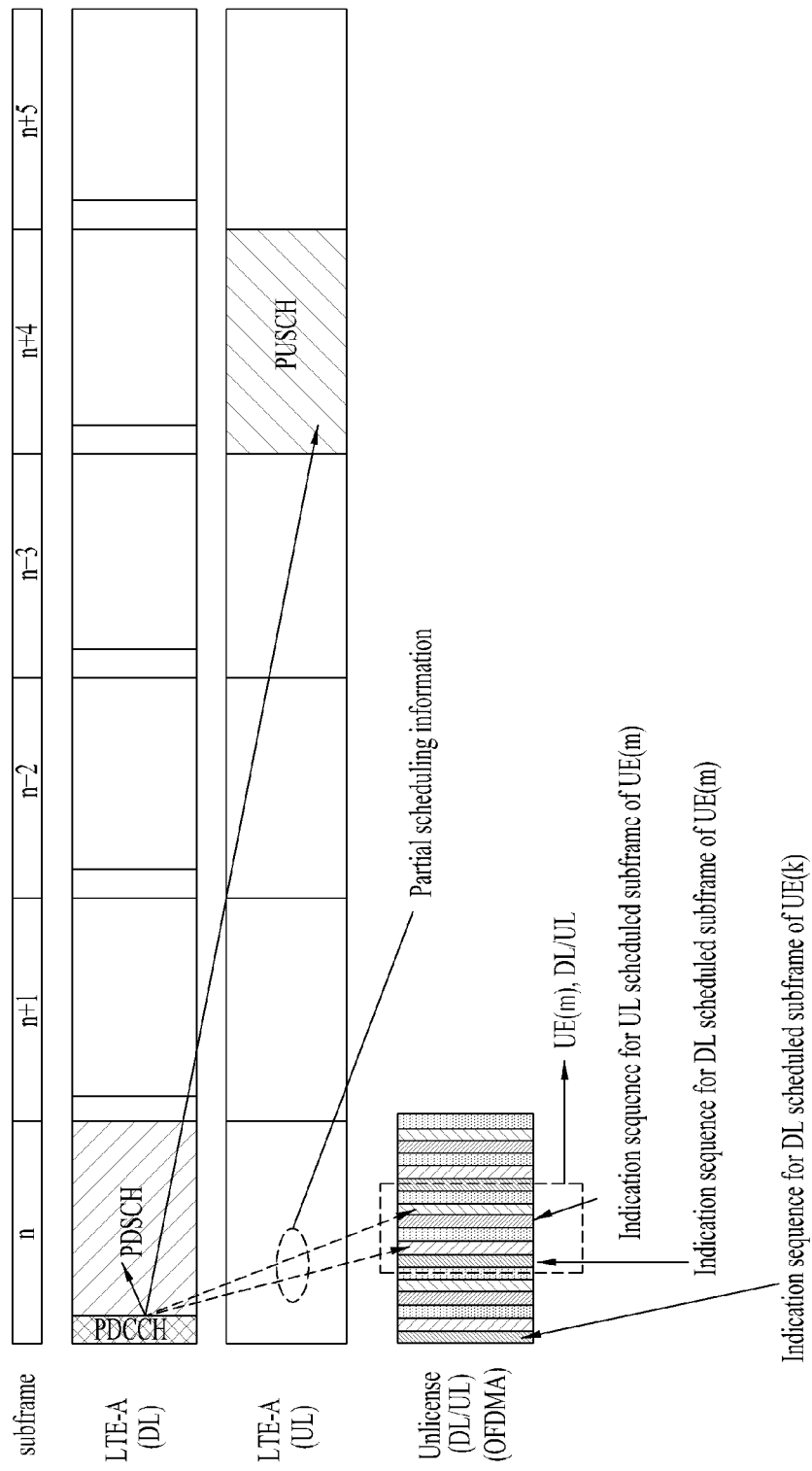
FIG. 22 illustrates a method of transmitting information over an OFDM type unlicensed band according to another exemplary embodiment of the present invention.

FIG. 22 illustrates a method of transmitting information over an OFDM type unlicensed band according to another exemplary embodiment of the present invention.

FIG. 22 shows an example of the above-described access slots shown in FIG. 21 being scheduled within the PDCCH of the Pcell. Referring to FIG. 22, it will be apparent that the base station transmits a PDSCH of an $n+1^{th}$ LTE-A subframe, a PUSCH of an $n+4^{th}$ LTE-A subframe, and a PDDCH designating a downlink access slot of an unlicensed band and an uplink access slot of an unlicensed band with respect to a user equipment (UE(m)) in an $n^{th}$ LTE-A subframe of the Pcell.

Similarly, with respect to a user equipment (UE(k)), the base station may also schedule a downlink access slot of an unlicensed band and an uplink access slot of an unlicensed band along with a PDSCH and/or PUSCH of an LTE-A frequency band within a PDCCH of the Pcell. Herein, with respect to the user equipment (UE(k)), information may be transmitted only with respect to the unlicensed band without applying cross-carrier scheduling. And, as described above, in this case, the scheduling information respective to the user equipment (U(k)) is required to be included in the access slot.

Alternatively, information may be transmitted only with respect to the unlicensed band, without applying cross-carrier scheduling with respect to all user equipments. And, in this case, the scheduling information respective to the user equipment may be added at the beginning or end of each access slot, or may be transmitted by using a masking method.

In the description provided above, although it is described that a UE identifier and/or an identifier (or indicator) notifying whether the current access slot corresponds to a downlink transmission specific access slot or an uplink transmission specific access slot is transmitted from a time section (e.g., 1 OFDM symbol time length, and so on), to which the sequence of each access slot is being transmitted, the present invention will not be limited only to this. More specifically, whenever required, control information, such as information on the length of the time section, an HARQ process number, MCS, and so on, may be transmitted to the corresponding time section.

Additionally, although the exemplary embodiments of the present invention are described based upon the FDD method, the technical spirit of the present invention may also be equally or similarly applied to the TDD method.

Figure 23:
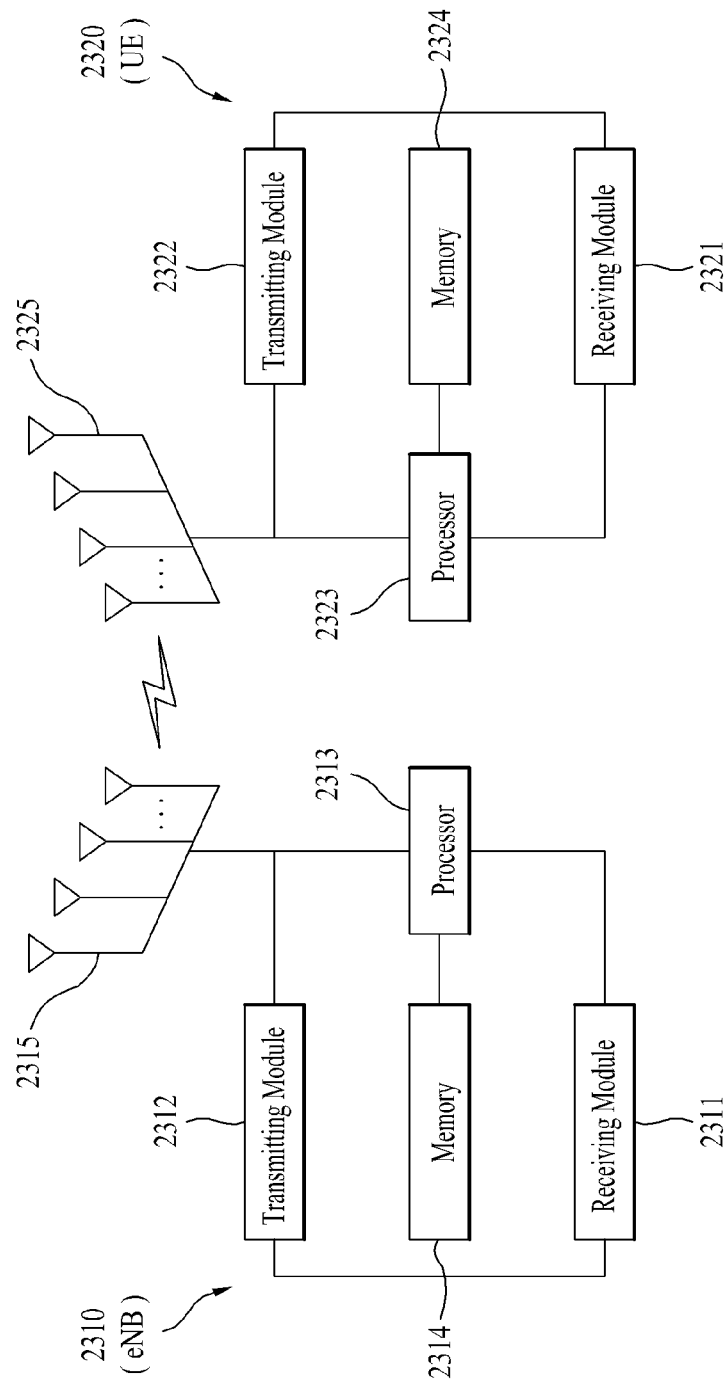
FIG. 23 illustrates an exemplary base station device and an exemplary user equipment (or terminal) device that can be applied to the embodiment of the present invention.

FIG. 23 illustrates an exemplary base station device and an exemplary user equipment (or terminal) device that can be applied to the embodiment of the present invention.

Referring to FIG. 23, the base station device (2310) according to the present invention may include a reception module (2311), a transmission module (2312), a processor (2313), a memory (2314), and multiple antennae (2315). The multiple antennae (2315) indicate that the base station device supports MIMO transmission/reception (or transception). The reception module (2311) may receive diverse signals, data, and information within an uplink from the user equipment. The transmission module (2312) may transmit diverse signals, data, and information within a downlink to the user equipment. The processor (2313) may control the overall operations of the base station device (2310).

The processor (2313) of the base station device (2310) according to an exemplary embodiment of the present invention may transmit a PDCCH (Physical Downlink Control Channel), which includes scheduling information respective to a resource area of an unlicensed band, over a licensed band, and the processor (2313) of the base station device (2310) may also transmit a sequence including an identifier of a user equipment to which the resource area is allocated over the unlicensed band. And, the timing at which the sequence is being transmitted may be set up to be prior to (or before) the resource area, which is scheduled by the PDCCH.

Moreover, in addition to the above-described functions, the processor (2313) of the base station device (2310) may perform functions of performing calculation operations of information received by the base station device (2310), information that is to be transmitted to an external target, and so on. And, the memory (2314) may store the calculated information for a predetermined period of time, and the memory (2314) may also be replaced with another element, such as a buffer (not shown).

Additionally, referring to FIG. 23, the user equipment device (2320) according to the present invention may include a reception module (2321), a transmission module (2322), a processor (2323), a memory (2324), and multiple antennae (2325). The multiple antennae (2325) indicate that the base station device supports MIMO transmission/reception (or transception). The reception module (2321) may receive diverse signals, data, and information within a downlink from the base station. The transmission module (2322) may transmit diverse signals, data, and information within an uplink to the base station. The processor (2323) may control the overall operations of the user equipment device (2320).

The processor (2323) of the user equipment device (2320) according to an exemplary embodiment of the present invention may receive a PDCCH (Physical Downlink Control Channel), which includes scheduling information respective to a resource area of an unlicensed band, from the base station over a licensed band, and the processor (2323) of the user equipment device (2320) may also receive a sequence including an identifier of a user equipment to which the resource area is allocated, the sequence being transmitted from the base station over the unlicensed band. And, the timing at which the sequence is being transmitted may be set up to be prior to (or before) the resource area, which is scheduled by the PDCCH.

In addition to the above-described functions, the processor (2323) of the user equipment device (2320) may perform functions of performing calculation operations of information received by the user equipment device (2320), information that is to be transmitted to an external target, and so on. And, the memory (2324) may store the calculated information for a predetermined period of time, and the memory (2324) may also be replaced with another element, such as a buffer (not shown).

The detailed structure of the base station device and the user equipment device, as described above, may be implemented by independently applying the detailed described in diverse exemplary embodiments of the present invention or may be implemented by simultaneously applying 2 or more exemplary embodiments of the present invention. And, for clarity in the description, overlapping contents will be omitted.

Additionally, in the description on FIG. 23, the description on the base station device (2310) may also be equally applied to a device operating as a downlink transmitting subject or an uplink receiving subject, and the description on the user equipment device (2320) may also be equally applied to a relay device operating as a downlink receiving subject or an uplink transmitting subject.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The detailed description of the preferred embodiments of the present invention disclosed herein as described above is provided so that those skilled in the art can easily implement and realize the present invention. Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. For example, anyone skilled in the art may combine each component disclosed in the description of the embodiments of the present invention. Therefore, it is intended that the present invention covers the modifications and variations of this invention provided they come within the scope of the appended claims and their equivalents, and it is not intended to limit the present invention only to the examples presented herein.

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

[Industrial Applicability]

In the description provided above, the present invention has been described based upon a structure being applied to 3GPP LTE group mobile communication systems. However, the present invention may also be applied to a variety of other mobile communication systems by using the same or equivalent principles.

The invention claimed is:

1. In a method for transmitting a signal of a base station in a wireless communication system, the method comprises:
   transmitting a PDCCH (Physical Downlink Control Channel) over a licensed band, the PDCCH including scheduling information respective to a resource area of an unlicensed band; and
   transmitting a sequence over the unlicensed band, the sequence including an identifier of a user equipment to which the resource area is allocated, and wherein the timing at which the sequence is transmitted is set prior to a resource area being scheduled by the PDCCH.

2. The method of claim 1, wherein the unlicensed band is configured of an uplink resource area and a downlink resource area being alternately repeated over the time domain.

3. The method of claim 1, wherein the sequence further includes an indicator indicating to which one of an uplink resource area and a downlink resource area the resource area corresponds.

4. The method of claim 1, wherein the sequence is selected from a group of sequences being grouped based upon to which one of the uplink resource area and the downlink resource area the resource area corresponds.

5. The method of claim 1, wherein the availability of the resource area is decided by carrier sensing respective to the unlicensed band.

6. The method of claim 1, wherein the sequence is scrambled by the identifier of the user equipment.

7. The method of claim 1, wherein the sequence is generated by using the identifier of the user equipment as seed.

8. The method of claim 1, wherein a time unit including a transmission time section of the sequence and a time section of the scheduled resource area within the unlicensed band corresponds to L×(1/N) (wherein N is an integer and not equal to 0), and wherein L corresponds to a subframe length within the licensed band.

9. The method of claim 8, wherein the value N is decided based upon a number of user equipments being scheduled by the base station over the unlicensed band.

10. The method of claim 1, wherein the transmission time section of the sequence and the time section of the scheduled resource area are continuous.

11. In a method for receiving a signal of a user equipment in a wireless communication system, the method comprises:
receiving a PDCCH (Physical Downlink Control Channel) from the base station over a licensed band, the PDCCH including scheduling information respective to a resource area of an unlicensed band; and
receiving a sequence including an identifier of a user equipment to which the resource area is allocated, the sequence being transmitted from the base station over the unlicensed band, and
wherein the timing at which the sequence is transmitted is set prior to a resource area being scheduled by the PDCCH.

12. In a base station device in a wireless communication system, the base station device comprises:
a transmitting module; and
a processor,
wherein the processor transmits a PDCCH (Physical Downlink Control Channel) over a licensed band, the PDCCH including scheduling information respective to a resource area of an unlicensed band, and transmits a sequence over the unlicensed band, the sequence including an identifier of a user equipment to which the resource area is allocated, and wherein the timing at which the sequence is transmitted is set prior to a resource area being scheduled by the PDCCH.

13. In a user equipment device in a wireless communication system, the user equipment device comprises:
a receiving module; and
a processor,
wherein the processor receives a PDCCH (Physical Downlink Control Channel) from the base station over a licensed band, the PDCCH including scheduling information respective to a resource area of an unlicensed band, and receives a sequence including an identifier of a user equipment to which the resource area is allocated, the sequence being transmitted from the base station over the unlicensed band, and wherein the timing at which the sequence is transmitted is set prior to a resource area being scheduled by the PDCCH.

* * * * *